United States Patent
Pendleton et al.

(10) Patent No.: US 12,516,653 B2
(45) Date of Patent: Jan. 6, 2026

(54) HYDRAULIC ASSEMBLY DEVICE, SYSTEM AND METHOD

(71) Applicant: GARTECH, LLC, Houston, TX (US)

(72) Inventors: Gary Pendleton, Shotley Bridge (GB); Gary Warren Stratulate, Houston, TX (US)

(73) Assignee: Gartech LLC, Houston, TX (US)

( * ) Notice: Subject to any disclaimer, the term of this patent is extended or adjusted under 35 U.S.C. 154(b) by 10 days.

(21) Appl. No.: 18/238,062

(22) Filed: Aug. 25, 2023

(65) Prior Publication Data

US 2023/0400007 A1 Dec. 14, 2023

Related U.S. Application Data

(62) Division of application No. 16/955,407, filed as application No. PCT/US2019/023616 on Mar. 22, 2019, now Pat. No. 11,788,505.

(60) Provisional application No. 62/814,632, filed on Mar. 6, 2019.

(51) Int. Cl.
  *F03C 1/06* (2006.01)
  *F04B 1/2078* (2020.01)
  *F04B 1/22* (2006.01)

(52) U.S. Cl.
  CPC .......... *F03C 1/0639* (2013.01); *F03C 1/0668* (2013.01); *F03C 1/0673* (2013.01); *F04B 1/2078* (2013.01); *F04B 1/22* (2013.01)

(58) Field of Classification Search
  CPC ........... F04B 1/22; F03C 1/0639; F16H 39/14
  See application file for complete search history.

(56) References Cited

U.S. PATENT DOCUMENTS

| | | |
|---|---|---|
| 2,737,020 A | 3/1956 | Berry |
| 2,917,898 A | 12/1959 | Berry |
| 3,119,230 A | 1/1964 | Kosoff |
| 3,863,448 A | 2/1975 | Purdy |
| 4,018,138 A | 4/1977 | Rumsey |
| 4,068,985 A | 1/1978 | Baer |
| 4,105,377 A | 8/1978 | Mayall |
| 4,309,152 A | 1/1982 | Hagen |
| 4,598,628 A | 7/1986 | Courtright |
| 4,692,105 A | 9/1987 | Leroy |

(Continued)

FOREIGN PATENT DOCUMENTS

| | | | |
|---|---|---|---|
| CN | 101743400 A | 6/2010 | |
| DE | 19926993 A1 * | 1/2001 | ............... F04B 1/16 |

(Continued)

OTHER PUBLICATIONS

Notification of Transmittal and International Search Report and Written Opinion for International Patent Application No. PCT/US19/23616 dated Jul. 19, 2019. PDF file. 10 pages.

(Continued)

*Primary Examiner* — Abiy Teka
(74) *Attorney, Agent, or Firm* — C. Tumey Law Group PLLC

(57) ABSTRACT

A device, system, and process for turning hydraulic pressure into rotational force and for turning rotational motion into hydraulic pressure. An example of the device/system for performing the process comprises actuators, rotationally positioned between two thrust plates that are fixed in a housing at an angle to a rotational axis and in parallel to each other.

13 Claims, 16 Drawing Sheets

(56) References Cited

U.S. PATENT DOCUMENTS

| | | | |
|---|---|---|---|
| 4,715,788 | A | 12/1987 | Kouns et al. |
| 4,723,892 | A | 2/1988 | Cowan |
| 4,747,266 | A * | 5/1988 | Cadee .................... F16D 31/02 |
| | | | 91/501 |
| 5,335,499 | A | 8/1994 | Thompson et al. |
| 7,191,738 | B2 | 3/2007 | Shkolnik |
| 7,337,869 | B2 | 3/2008 | Gray, Jr. et al. |
| 11,549,500 | B2 | 1/2023 | Stratulate et al. |
| 11,808,259 | B2 | 11/2023 | Pendleton et al. |
| 2004/0091363 | A1 | 5/2004 | Butler |
| 2007/0041849 | A1 | 2/2007 | Allen |
| 2008/0063538 | A1 | 3/2008 | Landrum et al. |
| 2012/0006013 | A1 | 1/2012 | McBride et al. |
| 2016/0025080 | A1 | 1/2016 | Zafar |

FOREIGN PATENT DOCUMENTS

| | | |
|---|---|---|
| EP | 0262471 A2 | 6/1989 |
| EP | 0262471 A3 | 6/1989 |
| EP | 2817167 A1 | 12/2014 |
| EP | 2817167 B1 | 3/2016 |
| EP | 3421790 A1 | 1/2019 |
| EP | 3594497 A1 | 1/2020 |
| FR | 2987316 A1 | 8/2013 |
| GB | 191317740 | 3/1914 |
| JP | 2018058481 A | 4/2018 |
| WO | 2013124557 A1 | 8/2013 |

OTHER PUBLICATIONS

InsaneHydraulics YouTube video. "Bent-axis hydraulic motor animation and exploded view." Uploaded May 6, 2010. YouTube Website, https://www.youtube.com/watch?v=ct8Au8T3arI. Accessed Jan. 9, 2024.

TechTrixInfo YouTube video. "Animation—How an axial flow variable displacement piston pump works." Uploaded Feb. 11, 2014. YouTube Website, https://www.youtube.com/watch?v=RjLaU8nFnzE. Accessed Jan. 9, 2024.

Yavor Hristov YouTube video. "Axial Piston Motor Animation." Uploaded May 20, 2014. YouTube Website, https://www.youtube.com/watch?v=1FpT9Z4at-w. Accessed Jan. 9, 2024.

Mohd Roezany Zakaria Youtube Video. "Hydraulic Rotary Piston Motor—SolidWorks Motion." Uploaded Oct. 21, 2015. YouTube Website, https://www.youtube.com/watch?v=9MKGYSudMoo. Accessed Jan. 9, 2024.

Mahmoud Al-Hossary YouTube Video. "7-Radial Piston Hydraulic Motors." Uploaded Mar. 20, 2018. YouTube Website, https://www.youtube.com/watch?v=o3jJSwvVPVs. Accessed Jan. 9, 2024.

Canada Office Action for CA Patent Application No. 3091811 dated Oct. 12, 2021. PDF file. 4 pages.

Response dated Feb. 10, 2022 to Canada Office Action for CA Patent Application No. 3091811 dated Oct. 12, 2021. PDF file. 4 pages.

EP App. No. 19917926.8—Reply to the Communication under Rules 161(2) and 162 EPC of Oct. 13, 2021. PDF file. 5 pages.

Hägglunds Drives. "Drives Compact Series CA 50-CA210." Hägglunds, 1998. PDF file. 7 pages.

Hägglunds Drives. "Compact CA Product Manual COMPACT EN396-10h 2011." Hägglunds, 2011. PDF file. 32 pages.

Womack Machine Supply Co. "Pressure Compensated Hydraulic Pumps." Company Website, https://www.womackmachine.com/engineering-toolbox/data-sheets/pressure-compensated-hydraulic-pumps/. Accessed Jan. 9, 2024.

Amendment in Response to Examiner's Action of Aug. 18, 2022 for Canadian Application 3091811 dated Nov. 8, 2022. Completed by Patent Agent John Singlehurst. PDF file. 9 pages.

Extended European Search Report for European Application 19917826.8-1004 dated Sep. 29, 2022. Completed by European Examiner. PDF file. 9 pages.

Notice of Requisition by the Examiner for Canadian Application 3091811 dated Aug. 18, 2022. Completed by Canadian Examiner. PDF file. 3 pages.

Office Action Summary for U.S. Appl. No. 16/955,407 dated Apr. 12, 2022. PDF file. 6 pages.

* cited by examiner

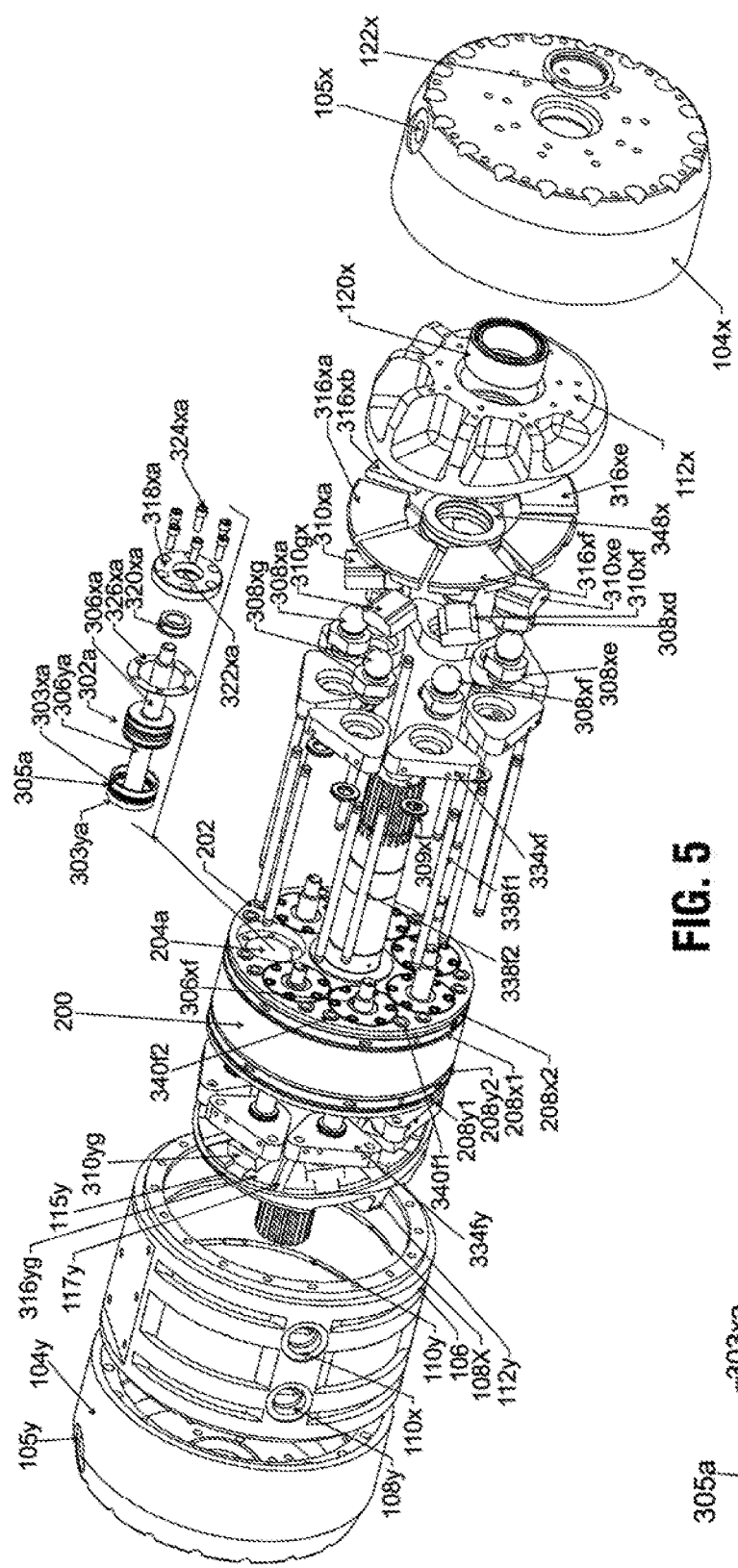
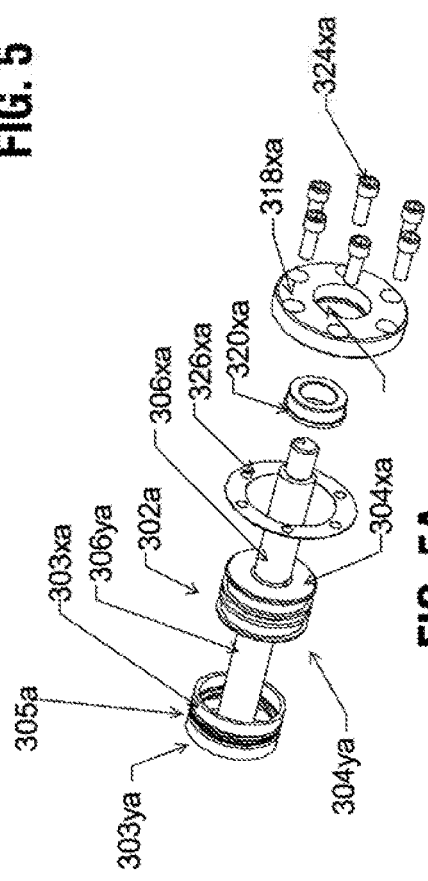
FIG. 5
FIG. 5A

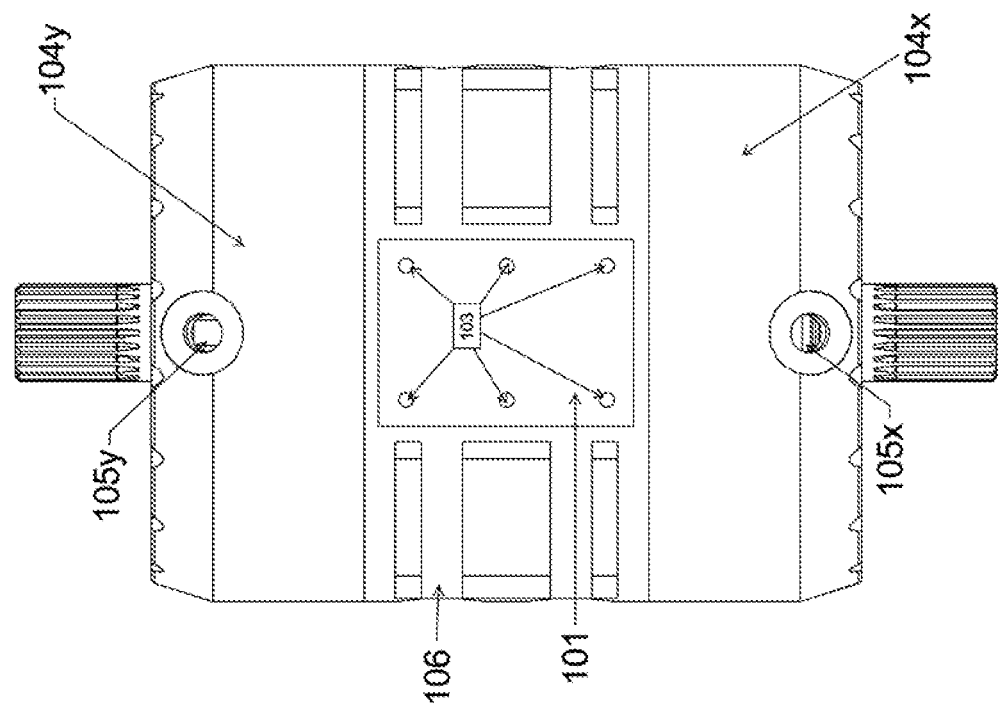
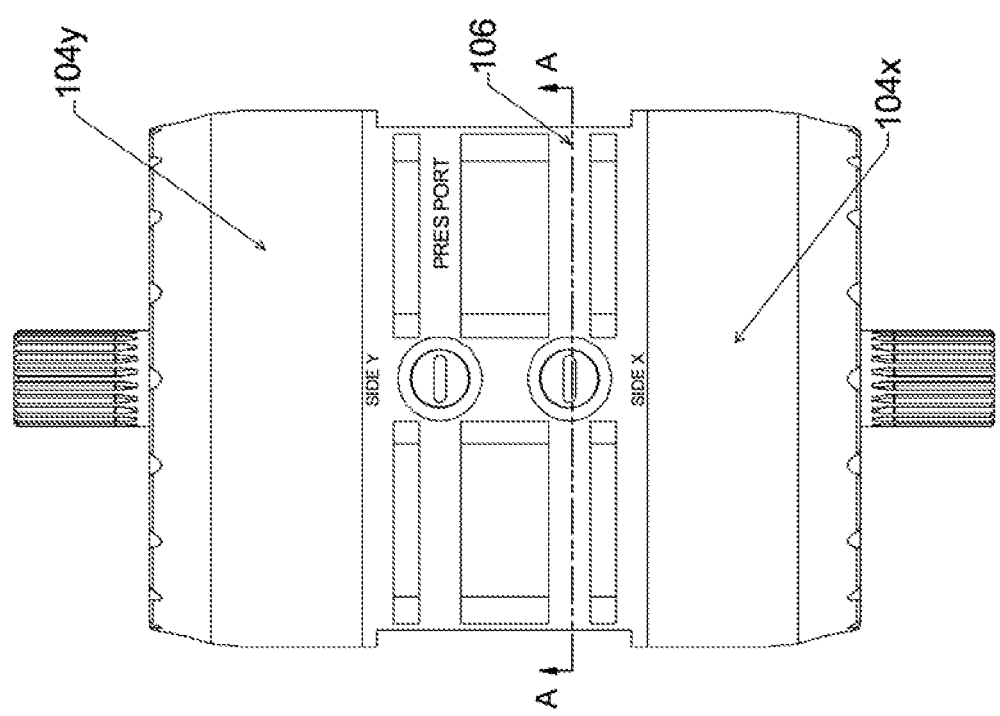
FIG. 8B
FIG. 8A

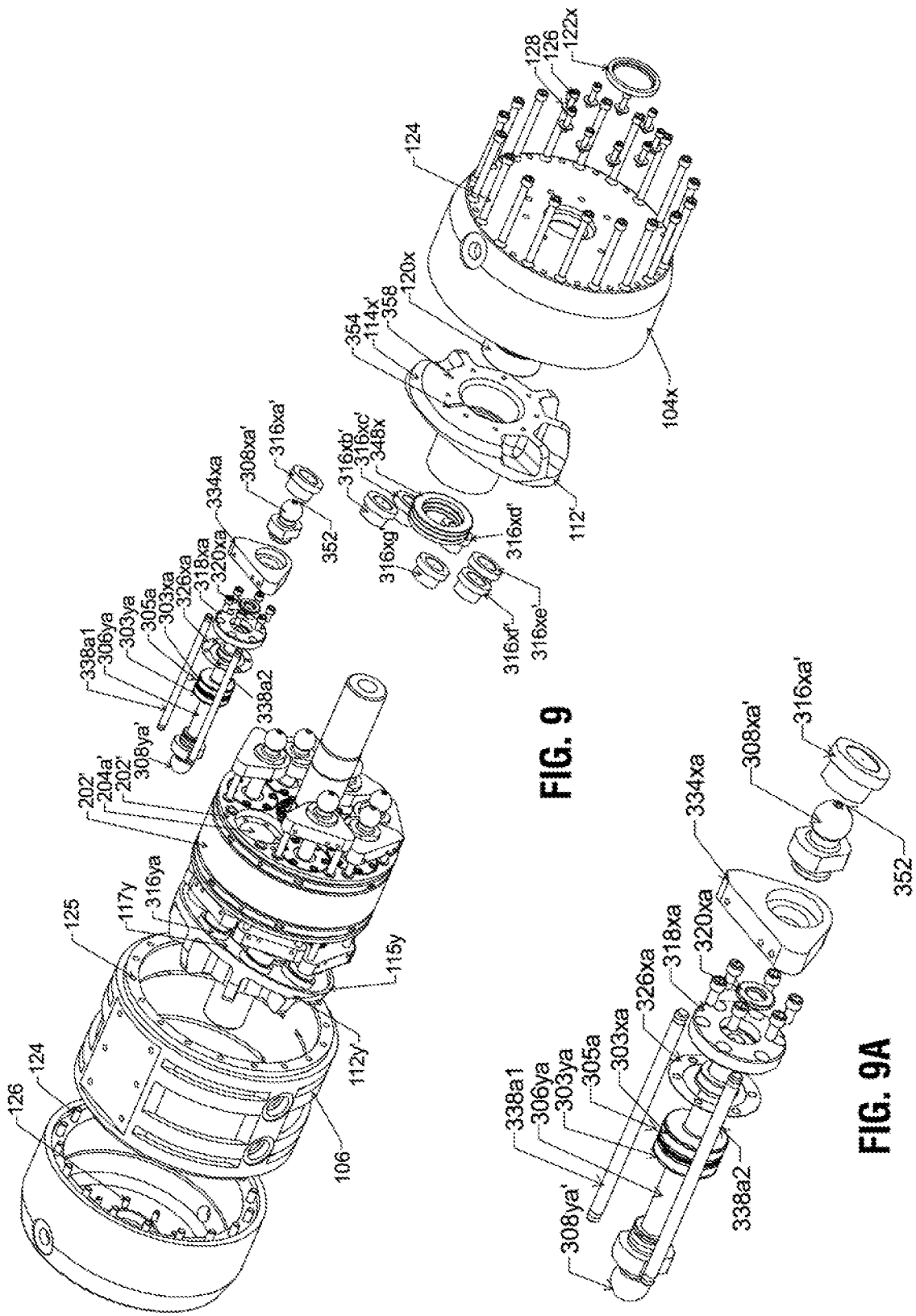

HYDRAULIC ASSEMBLY DEVICE, SYSTEM AND METHOD

RELATED APPLICATIONS

This application claims priority to U.S. Provisional Application No. 62/814,632, filed on Mar. 6, 2019.

BACKGROUND OF THE INVENTION

Currently, there are a variety of types of drive systems that include internal combustion engines, electric motors, and hydraulic motors. In many applications, internal combustion is not practical, and the choice is limited to electric motors and hydraulic. There, the trade-off is between speed and torque. For many applications, electric motors are used for high speeds where the torque loads are low. When there are high torque requirements, hydraulic motors are used. However, as speeds increase, a switch from the hydraulic motor to an electric motor is made. That switch requires gearing and transmissions that are prone to failure and require high maintenance. There is a need, therefore, for a hydraulic motor that can deliver higher speed.

Within the hydraulic motor applications, there is also a trade-off between speed and torque (at a given horse-power application). Axial motors allow for faster rpm but produce a smaller amount of torque. In high torque applications, typically, radial motors are used; however, they are not able to achieve the speed of an axial motor. Further, in traditional axial motors, less than ½ of the actuators are generating torque at any particular moment. In radial motors about ⅓ of the actuators are generating torque at any moment. For example, in the aerospace industry, an axial motor will be used because high speed operation and compact design are required to save weight while at the same time providing redundant operations. In the paper mill industry, a radial motor will be normally be used because of high torque capacity (particularly on start-up) and low rpm requirements. In some applications, multiple radial motors are teamed together with gear boxes (for example, heavy mining equipment application). This can occur because of space or redundancy requirements. In some applications, multiple motors are tied in to turn a critical shaft (again with gear boxes and transmissions) so that, in the event of a failure of pressure on one motor, there is a second motor that will still turn the shaft. However, gear boxes and transmissions are prone to failure, especially in harsh environments.

There is a need, therefore, for a motor that has higher torque than a traditional axial motor and higher speed than a radial motor and the ability to replace multiple motors with a single motor. There is a further need for redundancy of hydraulic rotational motion without the complexity, maintenance and lack of robustness experienced when teaming multiple motors together with a gear box and/or a transmission.

Further, in present hydraulic motors, whether radial or axial, a spinning plate valve with holes in it is needed to interact with a hole in the bottom of each piston for insertion of fluid into the piston when it is being pressurized. The input orifices are in sequence on a circumference for less than 180 degrees of the plate. An exhaust slot is positioned on the same circumference, opposite the holes. Therefore, only half the arc of the motor is operating to generate rotational force at any one time. This limits the efficiency of the motor. The size of the motor is dictated, in part, by the amount of arc ("torque arm") used to generate force. As more torque is needed, the diameter must increase. However, in many applications, the space is limited. There is a need, therefore, obtain more torque in the same diameter motor.

Also, the positioning of the exhaust slots and input orifices as the plate spins is critical, requiring close tolerance manufacturing, and causing timing problems for the motor. Further, the spinning plate is a moving part that is subject to failure. There is a need, therefore, for hydraulic motors with a simpler valve system.

Many hydraulic assemblies (pump/motors) are bent due to the configuration of the actuators (e.g., a swash-plate motor); causing problems when it would be desirable to pass items through the motor/pump. Rotary assemblies can have a passage through the center; however, the rotary layout limits the size of the passage way. There is a need for a symmetric motor that can mounted around a neutral axis or pass fluid or other items through its center at ever increasing significant diameters.

SUMMARY OF EXAMPLE EMBODIMENTS

The above needs have caused motor and pump failure, resulting in loss of life, environmental damage, and economic losses, all of which are reduced or eliminated with the present invention.

The various needs described above are meet in whole or in part by various aspects and examples of the invention. For example, with the axial motor/pump described in various examples of the invention, weight can be reduced and the number of motors required halved while still providing the required redundancy. Also, the number of radial motors can be reduced and the need for gearboxes eliminated as the radial motor described can be scaled to achieve the desired torque in a single motor. Further, material can be passed through some examples of the invention along an axis, and the passage can be sized for a variety of diameters.

According to one aspect of the invention, a hydraulic assembly (e.g., a motor or pump) is provided comprising:
  a housing having a housing axis,
  a rotor rotationally mounted in the housing along the housing axis,
  a set of hydraulic actuators mounted in the housing, each actuator having an actuator axis mounted parallel to the housing axis, wherein each actuator is in a fixed relation to a rotor for rotation around the axis as the rotor rotates, and
  substantially radial fluid inputs and outputs to each of the hydraulic actuators.

The above example has various advantages over the prior art. For example, radial inputs and outputs contributes to easier timing and avoids the need for additional spinning members that are used in systems having inputs and exhausts that are substantially axially aligned.

In at least one such example, the assembly also includes supply and exhaust grooves wherein the substantially radial fluid inputs and outputs comprise ports that communicate with supply and exhaust grooves in the housing and/or a secondary sleeve; in some examples, there is an input and exhaust pair of grooves for a first side of said set of hydraulic actuators and a second input and exhaust pair of grooves for a second side of said set of hydraulic actuators. The grooves in the outer face of the rotor define circumferential channels through which fluid is supplied to and exhausted from the actuators, which reduces the number of moving parts and timing issues present in the prior art. It also contributes to having multiple layers of actuators acting in parallel.

Also, having separate input supply and exhaust for the two sides allows rotation to occur even if there is a failure of one input. Further, separate input and supply for the two sides contributes to redundancy. In some examples of the invention, the hydraulic assembly is used in a motor mode, and the motor is designed with twice the capacity as needed. In the event there is a failure of an input of fluid, one side of the motor will not be operating; however, the other side will continue to cause the motor to turn, presuming its input has not also failed. This contributes to redundancy in a single motor and avoids the need for a transmission and gearbox to attach a second motor to a piece to be turned. The use of multiple independent sets of supply and return lines, contributes to a reduction in the complexity of a gear box in existing redundancy setups. Avoiding a transmission and gearbox reduces maintenance and increases reliability, since transmissions and gears are known to require high maintenance and are subject to failure in harsh environments.

According to another aspect of the invention, a hydraulic assembly is provided that comprises:
 a housing having a central axis;
 a rotor located along the central axis;
 a first thrust plate mounted at in the housing at a first housing 100 end around the rotor at an angle other than 90 degrees to the central axis;
 a second thrust plate mounted at in the housing at a second housing end around the rotor at the substantially the same angle as the first thrust plate; and
 hydraulic actuators slideably mounted between said first and said second thrust plates and fixed to the rotor.

In some such examples, fluid passages are provided to actuate the actuators such that a first fluid passage in fluid communication with the first set of actuators; a second fluid passage in fluid communication with the first set of actuators; a third fluid passage in fluid communication with the second set of actuators; and a fourth fluid passage in fluid communication with the second set of actuators; wherein said first and second fluid passages are operable to actuate the first set of actuators and said third and fourth fluid passages are operable to actuate the second set of actuators. Such passages contribute to, among other things, independent supply and exhaust of fluid from different sides of the assembly, allowing for operation of thrust and exhaust around 360 degrees of operation and allowing for rotation to continue in the event of a supply or exhaust failure to one side of the assembly.

With two thrust plates, force is applied around 360 degrees of the assembly in examples in which the actuators comprise a first set of actuators fixed to the rotatable shaft and engaging said first thrust plate and a second set of actuators fixed to the rotatable shaft and engaging said second thrust plate. In some examples, the actuators comprise double-acting actuators wherein said first set of actuators comprises a first side of said double acting actuators and said second set of actuators comprises a second side of said double acting actuators.

In at least some examples, the double acting actuators comprise: a piston head having a first face on said first side of said double acting actuators and a second face on said second side of said double acting actuators; a first push rod extending from said first face and a second push rod extending from said second face, the piston head mounted in a chamber that is ported for hydraulic insertion and exhaust between both piston head faces and the chamber, wherein said chamber is defined in a bore in the rotor and said rotor includes a substantially radial port for each chamber of each actuator. In a further example, pressure channels are provided that are longitudinally spaced along said rotor and 180 degrees opposite each other and around said rotor, wherein a first pair of the pressure channel is in fluid communication with ports on a first side of the pistons and wherein a second pair of the pressure grooves is in fluid communication with ports on a second side of the pistons. In one such an example, exhaust channels are provided 180 degrees opposite each pressure channel, wherein the exhaust channels are in fluid communication with ports that are not in fluid communication with said pressure grooves.

In further examples, pressure and exhaust grooves are formed in an input/output casing ("I/O casing") around the rotor having orifices (which may be tapped for hose fittings) for fluid to be input from outside the casing and orifices for exhaust of fluid from the assembly, wherein an input orifice is in fluid communication with a first pressure groove in an interior face in said I/O casing that extends almost half the circumference of the casing and an exhaust orifice is in fluid communication with a first exhaust groove in an interior face in said I/O casing that extends less than half the circumference of said I/O casing, and wherein a second input orifice and a second exhaust orifice are spaced longitudinally along the casing and opposite said first input orifice and said second exhaust orifice, wherein said second input orifice is in fluid communication with a second pressure groove in an interior face in said I/O casing that extends almost half the circumference of said I/O casing and wherein said second exhaust orifice is in fluid communication with a second exhaust groove in an interior face in said I/O casing that extends less than half the circumference of said I/O casing, wherein said pressure and exhaust channels are defined between the pressure and exhaust grooves in said I/O casing and an face of said rotor. In at least one alternative example, a sleeve between the outer casing and the rotor contains the pressure and exhaust grooves.

In still some further examples, the actuators include a set of spherical ball connectors and a set of slider components having a substantially flat side and a concave side of the same diameter as the spherical portion of the spherical ball connectors, wherein said rods are each capped by one of the spherical ball connectors and one of the slider components receiving a portion of the spherical ball connectors in the concave side and wherein the substantially flat side of the each slider component is in contact with a portion of one of said thrust plates. In some examples, the slider component is a two piece component having a concave receptacle that mates with the spherical ball connector and a tongue that mates with a slot in a thrust bearing. In an alternative example, the slider component comprises a unitary thrust bearing having a flat surface to interface with a thrust plate and a concave side receiving the spherical ball connector.

In some examples, a first thrust plate is fixed to the first end of the housing having an angled face that defining said first thrust plate mounted in the housing and a second thrust plate fixed to the first end of the housing having an angled face defining said second thrust plate mounted at in the housing.

In still further examples, brackets are provided that stabilize the push rods. Each of which receive one of the spherical ball connectors at the connection between the spherical ball connector and one of the rods and bars connected to the brackets and extending through slide holes in the rotor.

In still further examples, lubrication passages are provided in the rotor that connect during rotation to pressure channels and supply fluid to lubrication passages in the push rods that connect through the spherical ball connectors to supply lubrication to the interface of the ball connector and the concave surface into this it is received. A further passage through the slider component or thrust bearing that is in contact with the thrust plate lubricates the thrust bearing/thrust plate interface, and a passage in the thrust plate communicates fluid to a void behind the thrust plate that is in fluid communication with a roller bearing fixes between the housing and the rotor shaft. Passages in the rotor also supply fluid to a thrust bearing between the rotor and the housing for lubrication. In a further example, a lubrication passage in the rotor is connected to a pressure channel and supplies (for example, through spray action) fluid through the face of the rotor to the area in which the push rods reciprocate, lubricating a thrust bearing located between the fixed housing and the rotor.

In even further examples, the housing is supplied with drain holes on each end, and in some examples, multiple drain holes set about 180 degrees apart on each end, and a passage through the rotor, allowing for drainage of fluid that accumulated in the housing from lubrication, regardless of the orientation at which the assembly is mounted.

In yet further examples, the number of actuators is odd.

According to another aspect of the invention, a process of converting hydraulic pressure into rotational motion and for converting rotational motion into hydraulic pressure is provided, the process comprising:
 applying force to a first plate with a first actuator positioned between the first plate and a second plate wherein the first and second plates are at an angle to the direction of applying the force;
 allowing the first actuator to rotate around a rotational axis that is substantially in parallel with the direction of the application of force to the first plate; and
 applying force to the second plate, during the applying force to the first plate, with a second actuator positioned between the first plate and a second plate; and
 allowing the second actuator to rotate around the rotational axis.

According to a further aspect of the invention, a system is provided for converting hydraulic pressure into rotational motion and for converting rotational motion into hydraulic pressure, the system comprising:
 means for applying force to a first plate with a first actuator positioned between the first plate and a second plate wherein the first and second plates are at an angle to the direction of applying the force;
 means for allowing the first actuator to rotate around a rotational axis that is substantially in parallel with the direction of the application of force to the first plate; and
 means for applying force to the second plate, during the applying force to the first plate, with a second actuator positioned between the first plate and a second plate; and
 means for allowing the second actuator to rotate around the rotational axis;
 wherein said means for applying force to a first plate comprises a first thrust bearing in contact with the first plate and being part of the first actuator:
 wherein said means for applying force to a second plate comprises a second thrust bearing in contact with the second plate and being part of the second actuator;
 wherein said means for allowing the first actuator to rotate comprised a rotor attached to the first actuator positioned for rotation with respect to the first and the second plates; and
 wherein said means for allowing the second actuator to rotate comprises the rotor being attached to the second actuator.

While some of the processes in this document are described as applying force to a shaft, as when an assembly is used as a rotor, the processes are essentially reversed in other examples of the invention, in which an assembly is used as a pump.

According to another aspect of the invention, a process is provided comprising:
 applying force to a first plate with a first actuator positioned between the first plate and a second plate wherein the first and second plates are at an angle to the direction of applying the force;
 allowing the first actuator to rotate around a rotational axis that is substantially in parallel with the direction of the application of force to the first plate; and
 applying force to the second plate with the first actuator during a period when the first actuator is not applying force to the first plate.

In one such example, the process further comprises applying force to the second plate, during the applying force to the first plate, with a second actuator positioned between the first plate and a second plate; allowing the second actuator to rotate around the rotational axis; applying pressure to the first plate over a first substantially 180 degrees of rotation; applying pressure to the second plate over a second substantially 180 degrees of rotation; sliding contact surfaces between the plates and the actuator along the plate, wherein the first and second 180 degrees of rotation are substantially opposite each other.

According to a further aspect of the invention, a system is provided for converting hydraulic pressure into rotational motion, the system comprising: means for applying force to a first plate with a first actuator positioned between the first plate and a second plate wherein the first and second plates are at an angle to the direction of applying the force; means for allowing the first actuator to rotate around a rotational axis that is substantially in parallel with the direction of the application of force to the first plate; means for applying force to the second plate with the first actuator during a period when the first actuator is not applying force to the first plate.

In at least one such example, the system also includes: means for applying force to the second plate, during the applying force to the first plate, with a second actuator positioned between the first plate and a second plate; means for allowing the second actuator to rotate around the rotational axis, means for applying pressure to the first plate over a first substantially 180 degrees of rotation and applying pressure to the second plate over a second substantially 180 degrees of rotation; means for sliding contact surface between the plates and the actuator along the plate, wherein the first and second 180 degrees of rotation are substantially opposite each other.

In at least some examples, said means for applying force to a first plate with a first actuator comprises a first double-acting hydraulic piston/cylinder that is pivotally and slideably connected at a first end to the first plate;
 said means for allowing the first actuator to rotate around a rotational axis comprises means for fixedly connecting the first actuator to a rotor having an axis defining the rotational axis;
 said means for applying force to the second plate with the first actuator comprises the first double-acting hydraulic piston/cylinder pivotally and slideably connected at a second end to the second plate;

said means for applying force to the second plate, during the applying force to the first plate, with a second actuator positioned between the first plate and a second plate, comprises a second double-acting hydraulic piston/cylinder pivotally and slideably connected at a first end to the second plate;

said means for applying pressure to the first plate over a first substantially 180 degrees of rotation and applying pressure to the second plate over a second substantially 180 degrees of rotation comprises a set of double acting actuators fixed around the rotor wherein actuators on a first 180 degree arc are applying force to the first plate and actuators on a second 180 arc are applying force to the second plate;

said means for allowing the second actuator to rotate around the rotational axis comprises fixedly connecting the first actuator to the rotor;

said means for sliding contact surfaces between the plates and the actuator along the plate comprise a spherical ball connector received by a thrust bearing having a concave side receiving the spherical ball and a flat side in slideable contact with the plates;

said means for fixedly connecting the first actuator to a rotor having an axis defining the rotational axis comprises a cylinder cap attached to the rotor that defines an hydraulic chamber of the actuator in a bore of the rotor; and said a thrust bearing comprises a tongue connector receiving the spherical ball component mounted in a slotted bearing connector includes the flat side in slideable contact with the plates, wherein the slotted bearing connector is refrained from radial motion and motion of the tongue connector in the slotted bearing connector contributes to radial motion of the tongue connector and the spherical ball connector with respect to the surface of the thrust plate.

In an alternative example, said thrust bearing comprises a single piece that receives a spherical ball connector on one side and has a flat bearing surface on the other side; the alternative thrust bearing is not constrained in its motion.

According to still a further aspect of the invention, a process for turning a rotor is provided, the process comprising:

applying hydraulic pressure to a first actuator that is connected in a fixed position with the rotor such that when the first actuator rotates around the axis of the rotor, the rotor turns on the axis of the rotor, wherein the first actuator applies pressure to a first plate, the first plate having a center that is substantially co-axial with the axis of the rotor, and the first plate being fixed at an angle to an axis of the first actuator, and applying hydraulic pressure to a second actuator that is connected in a fixed position with the rotor such that when the second actuator rotates around the axis of the rotor, the rotor turns on the axis of the rotor, wherein the second actuator applies pressure to a second plate, the second plate having a center that is substantially co-axial with the axis of the rotor, and the second plate being fixed at the angle to an axis of the first actuator.

According to still a further aspect of the invention, a system is for turning a rotor is provided, the process comprising:

means for applying hydraulic pressure to a first actuator that is connected in a fixed position with the rotor such that when the first actuator rotates around the axis of the rotor, the rotor turns on the axis of the rotor, wherein the first actuator applies pressure to a first plate, the first plate having a center that is substantially co-axial with the axis of the rotor, and the first plate being fixed at an angle to an axis of the first actuator, and means for applying hydraulic pressure to a second actuator that is connected in a fixed position with the rotor such that when the second actuator rotates around the axis of the rotor, the rotor turns on the axis of the rotor, wherein the second actuator applies pressure to a second plate, the second plate having a center that is substantially co-axial with the axis of the rotor, and the second plate being fixed at the angle to an axis of the first actuator;

wherein said means for applying hydraulic pressure to a first actuator comprises a substantially radial port to a pressure chamber of the first actuator and connected to a first fluid input channel defined between a groove in a casing located around the rotor and the face of the rotor; and wherein said means for applying hydraulic pressure to a second actuator comprises a substantially radial port to a pressure chamber of the second actuator and connected to a second fluid input channel defined between a groove in a casing located around the rotor and the face of the rotor; and wherein the first and the second input channels are located about 180 degrees from each other with respect to the rotor and longitudinally spaced from each other with respect to an axis of the rotor.

According to yet another aspect of the invention, a process for turning a rotor is provided, the process comprising:

applying hydraulic pressure to a first side of a piston of a first actuator that is connected in a fixed position with the rotor such that when the first actuator rotates around the axis of the rotor, the rotor turns on the axis of the rotor, wherein the first actuator applies pressure to a first plate, the first plate having a center that is substantially co-axial with the axis of the rotor, and the first plate being fixed at an angle to an axis of the first actuator, and applying hydraulic pressure to a second side of the first piston, wherein the first actuator applies pressure to a second plate, the second plate being fixed at the angle to the axis of the first actuator.

In one such example, the process also includes: applying hydraulic pressure to a first side of a piston of a second actuator, wherein the second actuator applies pressure to the first plate during said Applying hydraulic pressure to a second side of the first piston, and applying hydraulic pressure to a second side of the first piston, wherein: the first actuator applies pressure to a second plate during said applying hydraulic pressure to a second side of the first piston, said applying hydraulic pressure to a first side of the piston comprises supplying hydraulic fluid through a substantially radial port into a pressure chamber defined in part by the first side of the piston.

In a further such example, the process also includes exhausting the fluid from the first side of the piston during said applying pressure to the second side of the piston, wherein said exhausting the fluid from the first side of the piston comprises connecting the substantially radial port to an exhaust orifice.

In some examples, said applying hydraulic pressure to a second side of the piston comprises supplying hydraulic fluid through a substantially radial port into a pressure chamber defined in part by the second side of the piston and further comprising exhausting the fluid from the second side of the piston during said applying pressure to the second side of the piston, wherein said exhausting the fluid from the second side of the piston comprises connecting the substantially radial port to an exhaust orifice.

In further examples, said applying hydraulic pressure to a first side of a piston of a first actuator comprises supplying from a pressure source that is independent from a source for said applying hydraulic pressure to a second side of the first piston.

Still further example include stabilizing a push rod, the push rod extending between the piston and a push rod head assembly that is in slideable contact with the first plate.

According to even a further aspect of the invention, a system is provided for turning a rotor, the system comprising:
  means for applying hydraulic pressure to a first side of a piston of a first actuator that is connected in a fixed position with the rotor such that when the first actuator rotates around the axis of the rotor, the rods turn around the axis of the rotor, wherein the first actuator applies pressure to a first plate, the first plate having a center that is substantially co-axial with the axis of the rotor, and the first plate being fixed at an angle to an axis of the first actuator, and
  means for applying hydraulic pressure to a second side of the first piston, wherein the first actuator applies pressure to a second plate, the second plate being fixed at the angle to the axis of the first actuator.

In at least one such example, the system also includes: means for applying hydraulic pressure to a first side of a piston of a second actuator, wherein the second actuator applies pressure to the first plate; means for applying hydraulic pressure to a second side of the first piston, wherein the first actuator applies pressure to a second plate while hydraulic pressure is applied to a second side of the first piston, wherein the first actuator applies pressure to a second plate; said means for applying hydraulic pressure to a first side of the piston comprises means for supplying hydraulic fluid through a substantially radial port into a pressure chamber defined in part by the first side of the piston; means for exhausting the fluid from the first side of the piston during said applying pressure to the second side of the piston; said means for applying hydraulic pressure to the sides of the pistons comprises substantially radial ports into a pressure chambers defined between the piston and said rotor, the ports being in fluid communication with hydraulic pressure during about ½ of a rotation with the rotor; and said means for exhausting the fluid comprises the substantially radial ports being in fluid communication with an exhaust groove during about ½ of a rotation with the rotor.

In a further examples, said means for exhausting the fluid from the first side of the piston comprises means for connecting the substantially radial port to an exhaust orifice; said means for connecting the substantially radial port to an exhaust orifice comprises a channel defined between an outer face of the rotor defining the chamber and a I/O casing mounted around the ported casing; and said means for applying hydraulic pressure to a second side of the piston comprises means for supplying hydraulic fluid through a substantially radial port into a pressure chamber defined in part by the second side of the piston.

In an even further example, the device includes means for exhausting the fluid from the second side of the piston during said applying pressure to the second side of the piston, wherein said means for exhausting the fluid from the second side of the piston comprises means for connecting the substantially radial port to an exhaust orifice.

In still another example, said means for stabilizing a push rod comprises bars connected to a bracket that is also connected to the push rods, the bars residing in slideable holes in the rotor, wherein the bars reciprocate in the rotor with the push rods.

In yet another example, thirteen actuators in a splined rotor are used with a proportionately large center opening, allowing for passage of material along the axis, depending on the application. For example, in some applications, the center opening (allowing for passage of material along the axis 102) is fitted with impellers, and the assembly is inserted in a pipeline or other flow stream. Pressure on the impellers causes the rotor to turn, allowing operation of the assembly in a pumping mode.

BRIEF DESCRIPTION OF THE DRAWINGS

For a thorough understanding of the present invention, reference is made to the following detailed description of the preferred embodiments, taken in conjunction with the accompanying drawings in which reference numbers designate like or similar elements throughout the several figures of the drawing. Briefly:

FIG. 5 is an exploded view of an example of the invention.
FIG. 5A is a portion of the exploded view of FIG. 5.
FIG. 8A a side view of an example of the invention.
FIG. 8B a bottom view of an example of the invention.
FIG. 9 is an exploded view of an example of the invention.
FIG. 9A shows a further example of the invention.

DETAILED DESCRIPTION OF EXAMPLES OF THE INVENTION

Figure 1:
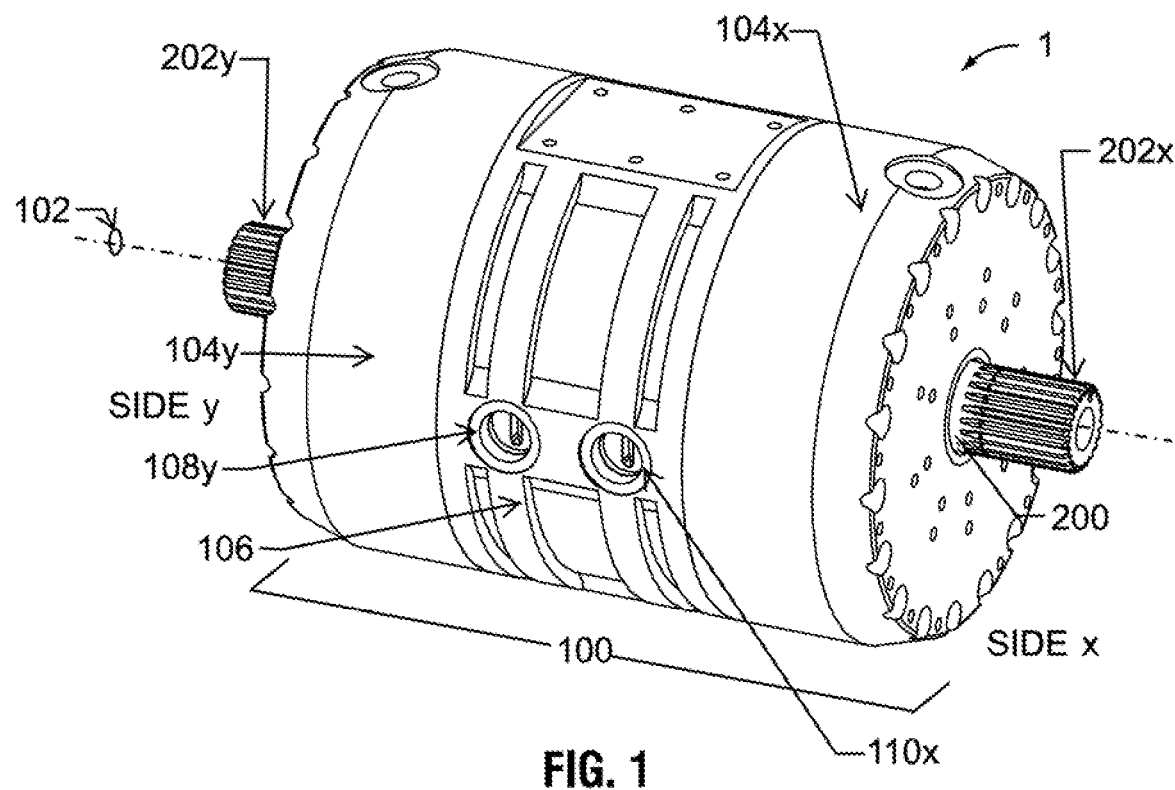
FIGS. 1 and 2 show and example of the invention.

Referring to FIG. 1, a hydraulic assembly (e.g., a motor or a pump) 1 is shown having a housing 100 having an axis 102. A "top" and "bottom" of assembly 1 is not used in most places in this document because assembly 1 is mounted horizontally (with respect to the axis of rotor 200) in some examples and vertically in others. For convenience of discussion, a "side x" is defined on one side of the axial center of assembly 1 and a "side y" is defined on the other side of the axial center. The example of assembly 1, as seen comprises end casings 104x and 104y (there is an end casing 104 on the "x" side and an end casing 104 on the "y" side) with a rotor 200 having splined shaft ends 202x and 202y for connection to an item to be controlled by (or to control) assembly 1. End casings 104x and 104y are connected to each other through center casing 106. Casings 104 and 106 are typical for a variety of those used for hydraulic fluid assemblies such as motors and pumps, depending on the size and application the assembly is designed for, and specifics regarding them will occur to those of skill in the art. A non-limiting set of appropriate materials for them includes: steel, stainless steel, and aluminum. Input orifice 110x and exhaust orifice 108y through center casing 106 are also shown in FIG. 1. Orifices 108 and 110 are typical for a variety of those used to input and exhaust hydraulic fluid and specifics regarding them will occur to those of skill in the art. A non-limiting set of them includes threaded, bolted, glands, quick connects, and welded connections.

Figure 2:
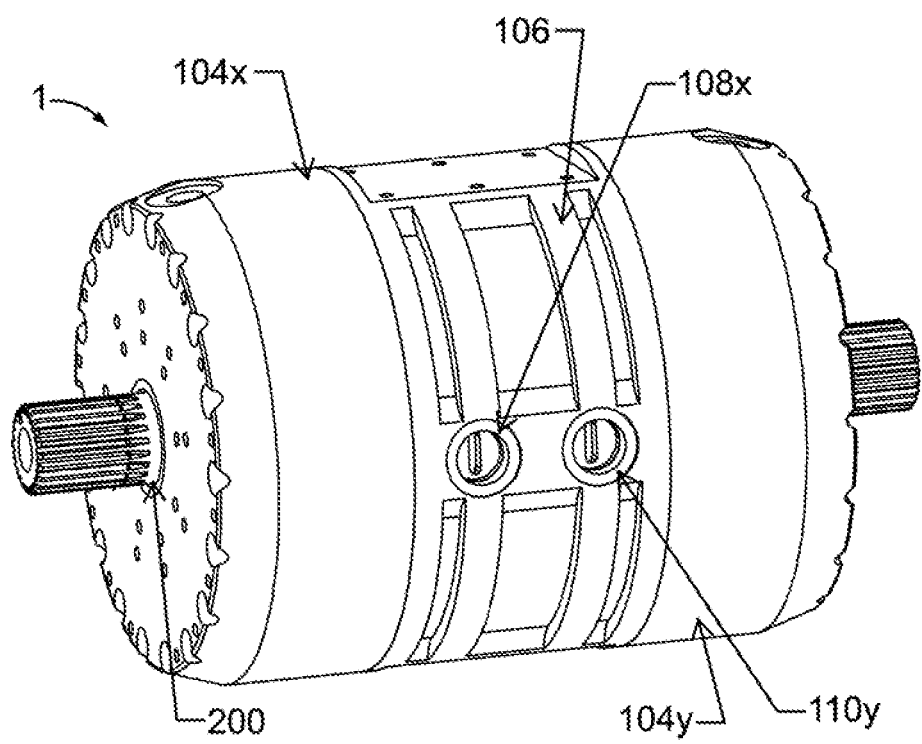

In FIG. 2, exhaust orifice 108x and input orifice 110y are shown on the opposite side of assembly 1 from that shown in FIG. 1. Each of the four orifices 108 and 110 communicate with a groove (or "galley") that is unique to that orifice. They reside on the inside of center casing 106 and will be illustrated below.

Figure 3:
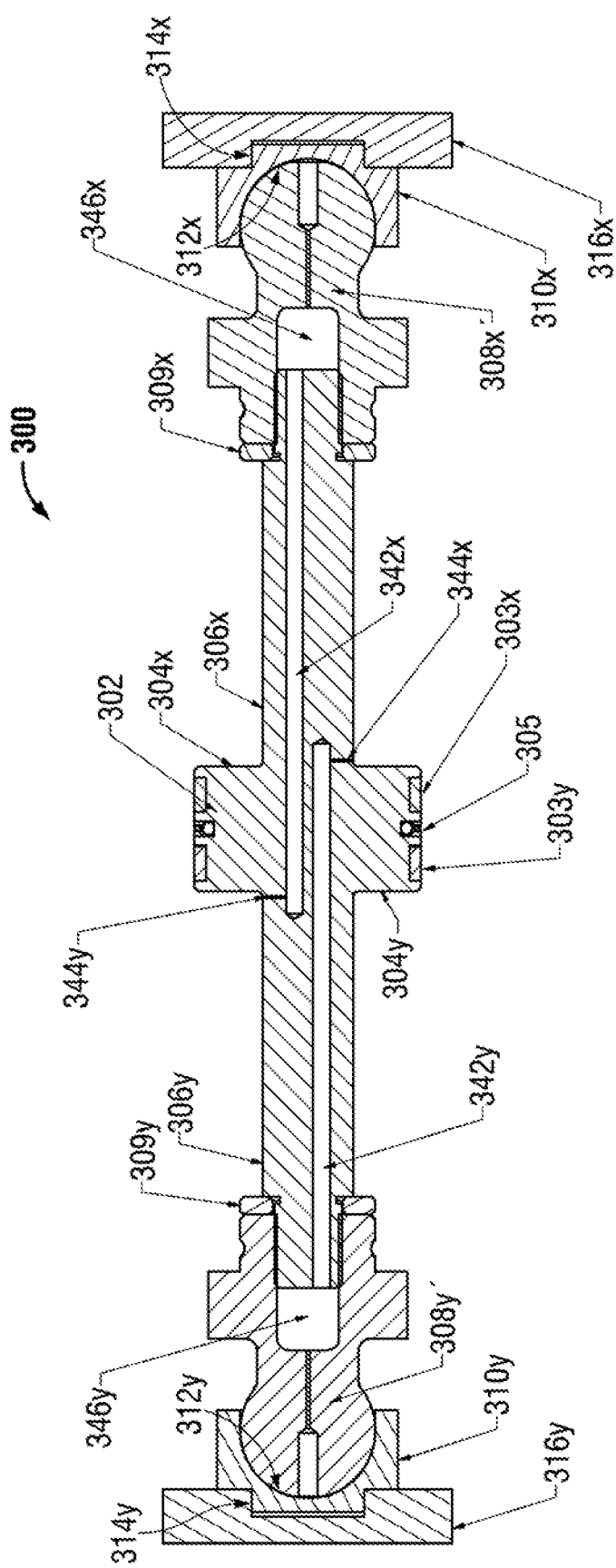
FIG. 3 shows a further example of the invention.

Referring now to FIG. 3, a section of a double-acting hydraulic actuator 300 is seen comprising a piston head 302 having a first piston head face 304x and a second piston head face 304y. Extending from faces 304x and 304y are piston rods 306x and 306y. Rods 306x and 306y are threaded into spherical ball connectors 308x and 308y with spacers 309x and 309y. Spherical ball connectors 308x and 308y engage tongue connectors 310x and 310y on concave sides 312x and 312y. Tongue connectors 310x and 310y have tongues 314x and 314y opposite the concave sides 312x and 312y that slot-connect into thrust bearings 316x and 316y, allowing for radial motion between tongue connectors 310x and 310y and thrust bearings 316x and 316y. The piston-connector assembly includes piston head 302, rods 306x and 306y, and spherical ball connectors 308x and 308y (which are connected to rods 306x and 306y, respectively, with a spacer 309x and 309y). Polymer ring 303x, seal 305, and polymer ring 303y (for example, a Trelleborg seal Turcon AQ PQE002500T46N) serve the purpose of pressure sealing opposing sides of the piston. An acceptable example of rings 303x and 303y is a Trelleborg Slydring GP0B2500-C320, which provide piston stabilization and guidance. Other acceptable rings are offered by other recognized hydraulic seal providers, for example Parker and James Walker.

In FIG. 3, the piston-connector assembly includes piston head 302, rods 306x and 306y, and spherical ball connectors 308x and 308y (which are connected to rods 306x and 306y, respectively, with a spacer 309x and 309y). Also, in this particular embodiment, the head and rods are integrally formed with lubrication channels 342x and 342y running longitudinally through the rods 306x and 306y, respectively, as well as through piston head 302. In some alternative examples, the head and rods are separable and connected by any connectors known in the art.

In the illustrated example, the connection of a spherical ball connector 308 to a piston rod 306 is by a threaded connection. Other connections that will occur to those of skill in the art (e.g., press-fit, shrink fit, welds, bonds, and wedges) are used in some alternative examples.

In some embodiments in which heads 302 and rods 306 are separate pieces, they are connected, for example, by threads, welds, braze, shrink fit, press-fit construction, and other connections that will occur to those of skill in the art (along with sufficient seals to contribute to the lubrication described in this document).

In some examples, rotor 200 comprises steel (e.g. AISI 4130), stainless steel, and other metal alloys. In some alternative examples, rotor 200 is constructed of fabricated or forged stainless or alloy steel material depending on size and application circumstances that will occur to those of ordinary skill without need for further elaboration in this document.

In some examples, spherical ball connectors 308 comprise steel (e.g., AISI 4130). In some alternative examples, spherical ball connectors 308 are constructed of bronze (e.g., C52400), plastic (e.g., bearing grade), brass, copper, and cast iron, depending on size and application circumstances that will occur to those of ordinary skill without need for further elaboration in this document.

In some examples, tongue connectors 310 comprise bearing grade bronze (e.g., grade C52400). In some alternative examples, tongue connectors 310 are constructed of resin polymers compounds, plastic, brass/copper cast iron, depending on size and application circumstances that will occur to those of ordinary skill without need for further elaboration in this document.

In some examples, thrust bearings 316 comprise bearing grade bronze (e.g., grade C52400). In some alternative examples, thrust bearings 316 are constructed of resin polymers compounds, plastic, and brass/copper cast iron, depending on size and application circumstances that will occur to those of ordinary skill without need for further elaboration in this document.

Figure 4:
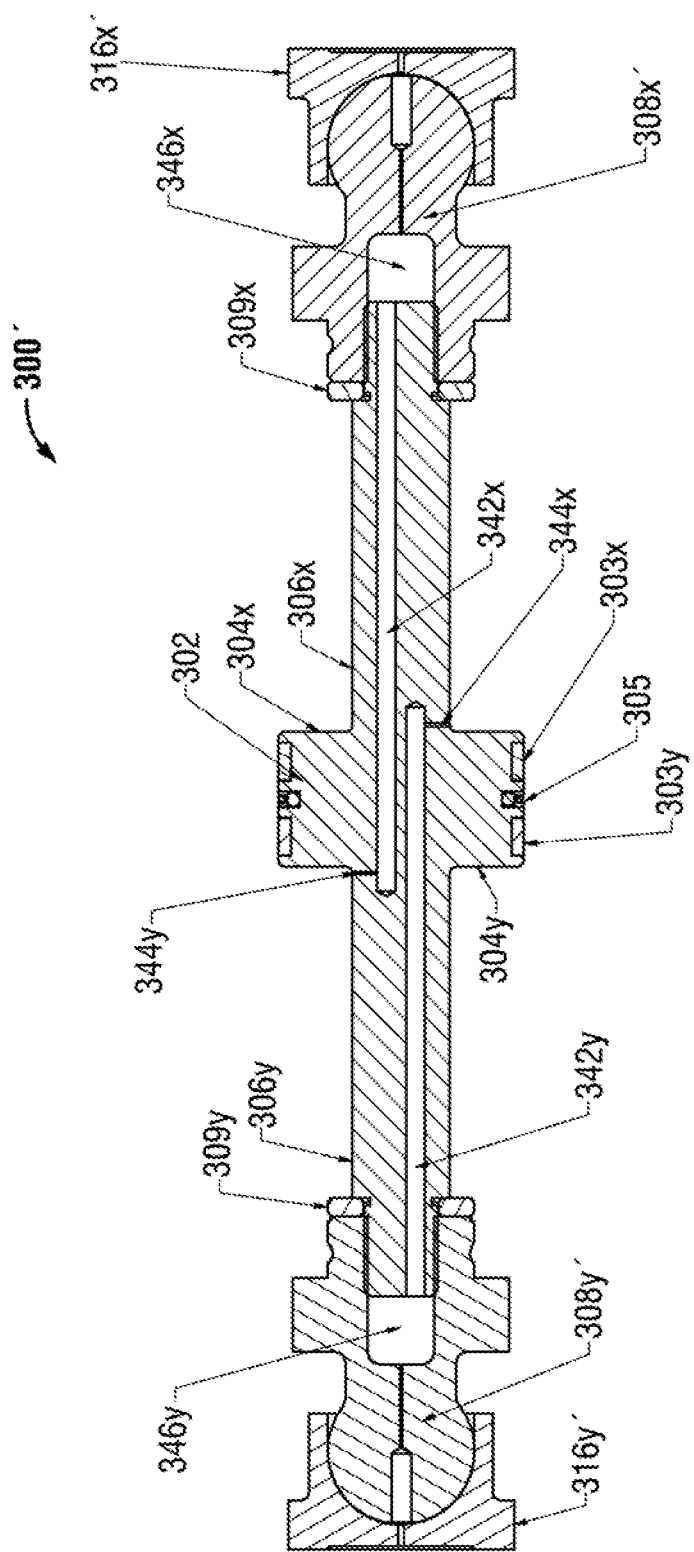
FIG. 4 shows another example of the invention.
Figure 5B:
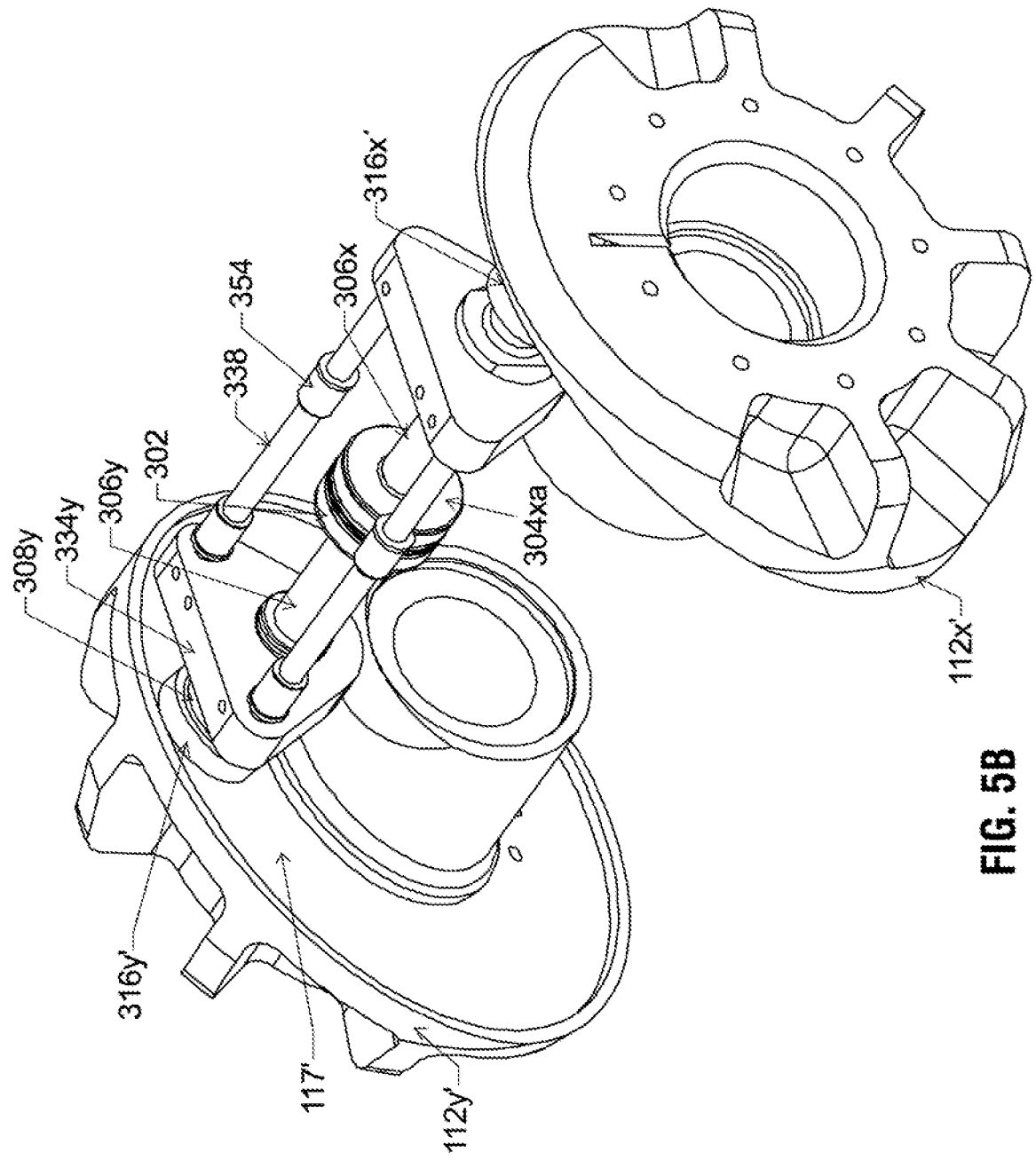
FIG. 5B is three-dimensional view of an example of the invention.

Referring now to FIG. 4, an alternative actuator 300' is seen, which is almost identical to actuator 300; however the tongue connectors 310x and 310y and thrust bearings 316x and 316y have been replaced by a spherically-connected thrust bearing 316x' and 316y' which engage with thrust bearing surface 117x' and 117y' (see, FIG. 5B). Also, spherical ball connectors 308' are slightly different from connectors 308 (as explained below). In the illustrated example, thrust bearings 316' are not constrained by shoulders of thrust plate 112 and are able to move radially to trace a non-circular path on the thrust plate surface 117 of FIG. 5 (described below). The use and operation of actuator 300' will be explained later in this document.

Referring now to the exploded view of FIG. 5, the assembly 1 is seen in a seven-actuator embodiment. Each of the actuators in this description will be designated actuators a-g. In the illustration, rotor 200 has a rotor face 202 with rotor bores 204a-204g (seen also in FIGS. 8D and 11) holding piston assembles that are best seen in FIG. 5A. In some alternative examples, 13 actuators are used. In still further examples, any number of actuators may be used, depending on the output specifications of a desired assembly, although an odd number is preferred to reduce the chance of a lock up. An odd number of pistons always means that there is only 1 potentially 'dead' cylinder (in dwell). With even numbers there is a possibility of 2 'dead' cylinders (dwell at top and bottom), resulting is less efficient operation.

FIG. 5A illustrates an assembly from rotor bore 204a in which piston rods 306xa and 306ya extend from a piston head 302a that has two faces 304xa and 304ya (not seen). As mentioned above, in some examples, piston rods 306 are integral with the piston head 302 from which they extend. In some alternative examples, they are attached by any means known in the art. A unitary example has the advantages of:

strength, ease of manufacture, assembly, disassembly and service, robustness, strength and integrity, and eccentric conformity.

Referring again to FIGS. 5 and 5A, piston rods 306xa and 306ya pass through piston covers (only cover 318xa is illustrated for simplicity). Piston cover 318xa is stabilized by a bushing 320xa and seal 322xa. Piston rod 306xa is guided by piston cover 318xa, piston cover gasket 326xa, seal 322xa, and bushing 320xa, (when screwed into rotor face 202 by screws 324xa). Rotor bore 204a is counter bored for acceptance of piston cover 318xa, allowing transfer of axial force from the action of piston rods 306xa and 306ya to cause rotation of rotor 200, which is supported in end casings 104x and 104y by shaft bearings 120x and 120y (not seen, but located in thrust plate 112y) that are located in end casings 104x and 104y respectively, along with radial seals 122x and 122y (not seen). Acceptable shaft bearings include SKF C 5915 V; acceptable radial seals are a Trelleborg radial seal TRAA00720. Others will occur to those of ordinary skill without further elaboration. As illustrated, only the components connecting rod piston head 302a and piston rod 306xa to rotor 200 are shown, and a person of ordinary skill will understand that identical components are connected to piston rod 306ya and rotor 200 on the y-side of assembly 1.

Referring again to FIG. 5, each of rotor bores 204a-204g (seen also in FIGS. 8D and 11) include a piston assembly as described above with regard to FIG. 5A. The components that are connected to and move with piston rod 306xf will be described by way of example. A person of ordinary skill will understand that identical connections exist to all the other piston rods 306 on both the x-side and the y-side. As seen, piston rod 306xf engages spherical ball connector 308xf through spacer 309xf. Spherical ball connector 308xf has two degrees of freedom in tongue connector 310xf and attaches piston rod 306xf to slotted thrust bearing 316xf by a slotted and sliding connection between tongue connectors 310xf thrust bearing 316xf Slotted thrust bearing 316xf is held by shoulders (not seen) of thrust plate 112x that prevents radial motion of slotted thrust bearing 316xf while allowing slotted thrust bearing 316xf to slide around the thrust surface 117x (see FIG. 13) of a thrust plate 114x. This arrangement is best seen with reference to the y-side of the assembly. There, reference is made to piston assembly g rather than piston assembly f because the particular parts to be addressed are at an easier angle for understanding. As seen, slotted thrust bearing 316yg is held axially by thrust plate shoulder 115y, while still allowing slotted thrust bearing 316yg to slide on thrust plate surface 117y. The slotted and sliding connection between tongue connector 310yg and thrust bearings 316yg allows radial movement between the two to accommodate the elliptical path traced by spherical ball connector 308yg (not seen).

Referring to FIG. 5B the interaction of the actuators 300 and thrust plates 112 is further illustrated. In FIG. 5B, one actuator is seen in contact with two thrust plates. The actuator comprises slotted thrust bearing 316y, tongue connector 310y, piston rod 306, piston head 302, piston rod 306x, spherical ball connector 308y, tongue connector 310x, and thrust bearing 316x' (along with the pressure chambers defined by the rotor bores and caps described below). Thrust plates 112x' and 112y' are alternatives to thrust plates 112x and 112y, (for example, they include a thrust plate lubrication bores 358 slots 360 (shown in FIG. 13), and have a different shape); those differences will be described later in this document.

Referring again to FIG. 5, spherical ball connector 308xf is received in bracket 334xf that acts to stabilize push rod 306xf with stabilization bars 338/1 and 338/2, which extend through openings 340/1 and 340/2 in rotor face 202 to bracket 334yf that receives spherical ball connector 308yf (not shown).

Referring now to FIG. 5B, the bracket and stabilization bar structure is illustrated with piston rods 306x and 306y being stabilized by stabilization rods 338 that are themselves guided by bushings 354 that reside in bores 340 in rotor 200. In the illustration thrust bearing 316' is an alternative to the slotted thrust bearing 316 and tongue connector 310 and as will be described later in this document.

Referring again to FIGS. 5 and 5A, a pressure chamber (illustrated below) is defined by piston head 302a, rod 306xa, piston cover 318xa, and rotor bore 204a. A similar pressure chamber is formed on the y side of piston head 302a; similarly each of pistons 302a-302g has two pressure chambers, making the actuators double acting.

Figure 6:
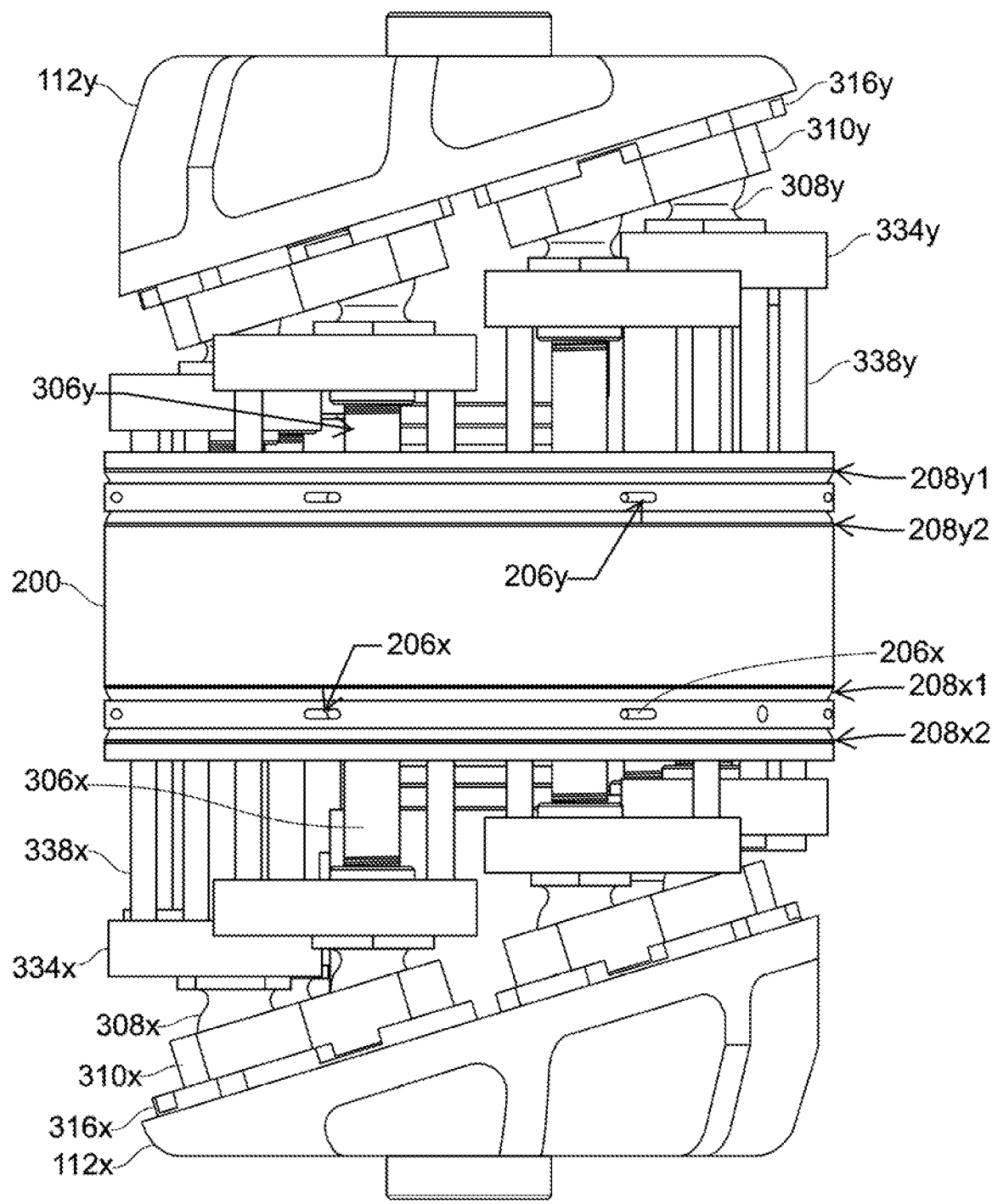
FIG. 6 a perspective view of an example of the invention.

Referring now to FIG. 6, a perspective view without end casings 114x and 114y and without center casing 106 is seen. In that view, rotor 200 is seen with ports 206x and 206y for each double-acting actuator of a seven-actuator embodiment that are sealed by port seals 208x1, 208x2, 208y1, and 208y2 that engage with the inner face of center casing 106 (not seen). Components of the actuators are labeled for further illustration. As seen, piston rods 306 engage spherical ball connectors 308 that attach to tongue connectors 310 that are slideably connected to thrust bearings 316 for engagement with thrust plates 112. In some examples, thrust plates 112 comprise alloy steel (e.g., AISI 4130), and stainless steel. In some alternative examples, tongue connectors 310 are constructed of bearing grade bronze (C52400), or cast iron, depending on size and application circumstances that will occur to those of ordinary skill without need for further elaboration in this document.

Figure 7A:
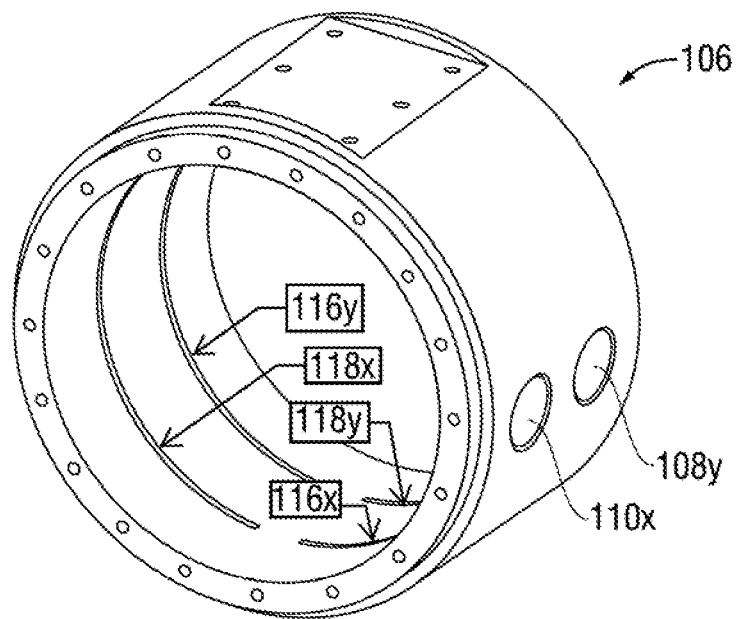
FIGS. 7A and 7B are three-dimensional views of an example of the invention.
Figure 7B:
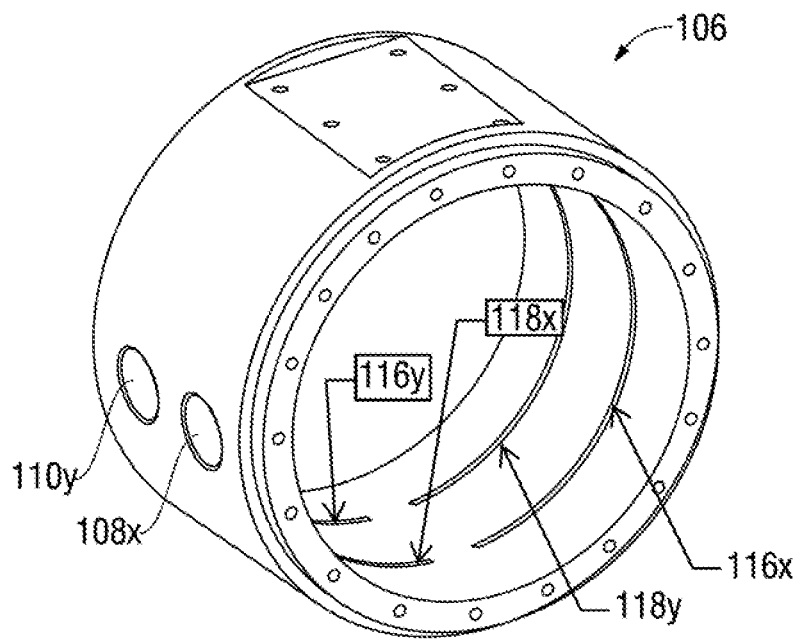

FIGS. 7A and 7B show a three-dimensional view of center casing 106 that resides around the rotor 200 of FIG. 6. In the illustrated example, there are four orifices (two input and two exhaust) and four grooves (again, two input and two exhaust). Input port 110x is seen communicating with a groove or galley 116x, and exhaust orifice 108y is in communication with groove 118y. Input orifice 110y is seen in communication with groove 116y and exhaust orifice 108x communicates with groove 118x. Thus, there are two input pressure grooves that are both longitudinally spaced along the rotor 200 and 180 degrees opposite each other around the rotor 200. Likewise, there are two exhaust grooves that are both longitudinally spaced along the rotor 200 and 180 degrees opposite each other around the rotor 200.

Referring to FIGS. 6, 7A, and 7B, together, during rotation, input pressure groove 116x is in fluid communication with ports 206x on a first side of the pistons and pressure input channel 116y is in fluid communication with ports 206y on a second side of the pistons of actuators on the opposite side of the hydraulic assembly. Likewise, exhaust groove 118x is longitudinally spaced along rotor 200 from exhaust groove 118y; each of the two exhaust grooves is located opposite one of the input grooves, and the exhaust grooves are in fluid communication with some of ports 206 that are not in fluid communication with either of the input grooves.

Thus, all actuators 300a-300g (in FIG. 8D) are operating (when in a motor mode) to drive rotation, except when a port 206 for a chamber of an actuator is between grooves. This occurs because, as the system rotates, the two x and y chambers of any one actuator 300 are in opposite modes; one is in connection with an input groove 116, and one is in connection with an exhaust groove 118 for about 180 degrees of rotation, and they then switch for the next 180 degrees of rotation. The arrangement contributes to a constant application of fluid without the complex alignment of previous hydraulic systems and greatly reducing the possibility of fluid lock. Likewise, the arrangement avoids the use of a ported, sliding plate used in the prior art.

Referring now to FIG. 8A, a side view of an assembly 1 is seen comprising end casings 104$x$ and 104$y$ spaced apart by center casing 106.

In FIG. 8B, a bottom view of assembly 1 is seen with a torque restraint 101 including torque restraint taps 103 to receive bolts (not show) for mounting the assembly 1. Also seen are drain holes 105$x$ and 105$y$ that allow lubrication fluid that accumulates in the end casings 104 to be drained. Further drain holes (not shown) provided on the other side of end casings 104$x$ and 104$y$. Having drain holes positioned in such positions allows the assembly 1 to be mounted horizontally or vertically with respect to the axis of rotor 200.

Figure 8C:
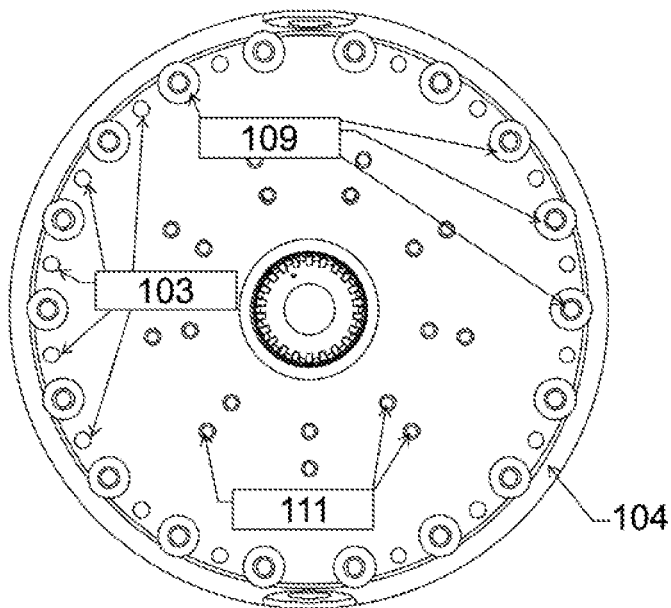
FIG. 8C shows an end view of an example of the invention.

FIG. 8C shows an end view of assembly 1 showing flange taps 103 for flange mounting assembly 1 in a vertical position, and counter-bored restraining bolt openings 109 for attaching end casings 104$x$ and 104$y$ with I/O casing 106. Also seen are drilled-hole bolt openings 111 for attaching end casing 104$x$ to thrust plate 112$x$.

Figure 8D:
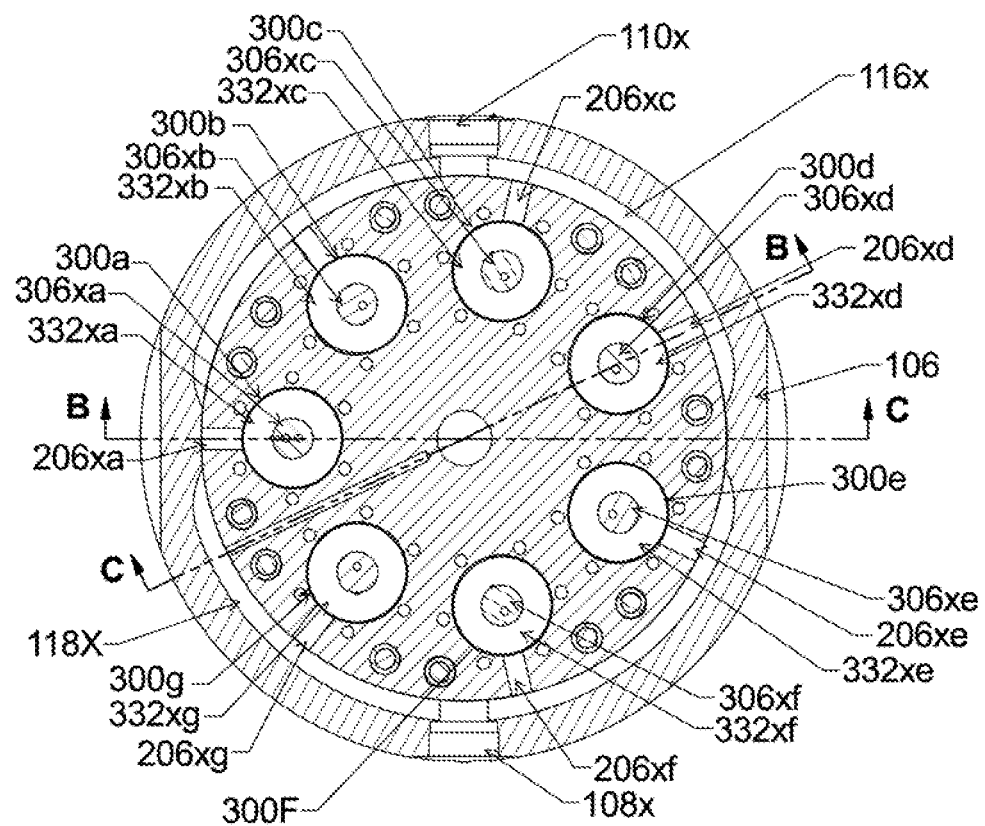
FIG. 8D shows a sectional view of an example of the invention.

FIG. 8D shows a sectional view taken along line A in FIG. 8A, in which seven actuators 300*a*-300*g* (and, alternatively, 300'*a*-300'*g*) are seen having piston rods 306$x$ in pressure chambers 332$xa$-332$xg$ in rotor 200. Pressure chambers 332$xa$-332$xg$ communicate through radial ports 206$xa$-206$xg$ in rotor bores 204*a*-204*g* (seen also in FIGS. 8D and 11) with input groove 116$x$ and exhaust groove 118$x$ in center casing 106. An inlet orifice 110$x$ and exhaust orifice 108$x$ are also seen in center casing 106. It should be noted that FIG. 8D is a section through the x-side of casing 106 at the location of input groove 116$x$ and exhaust groove 118$x$. At the same location for input orifice 110$y$ and exhaust orifice 108$y$, located longitudinally spaced from input orifice 110$x$, are grooves that are arranged so that, when an x-side of an actuator is having fluid supplied to it, the y-side of the actuator is being exhausted.

Figure 8F:
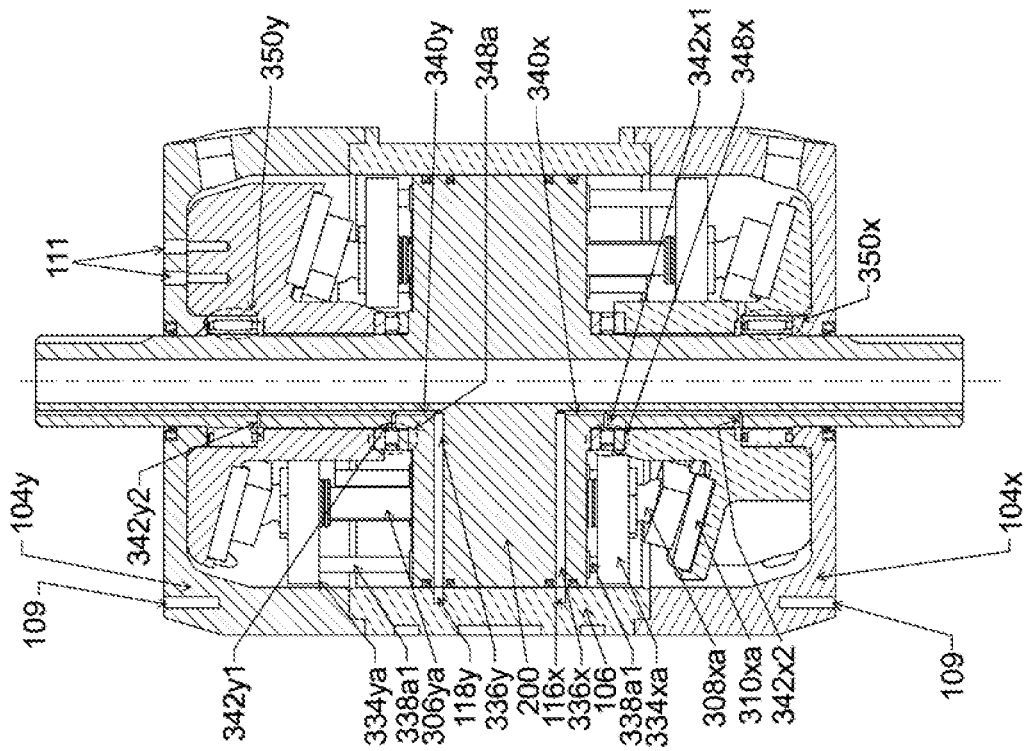
FIG. 8F is a sectional view along line C of FIG. 8D.
Figure 8E:
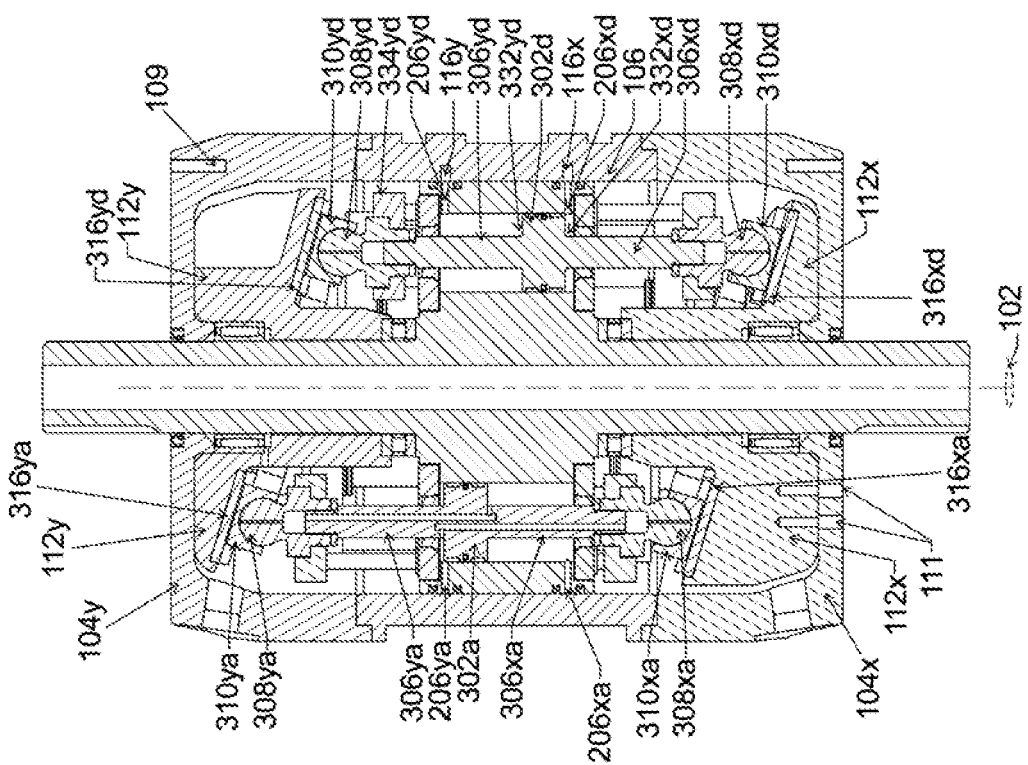
FIG. 8E is a sectional view taken along line B of FIG. 8D.

FIG. 8E is taken along line B of FIG. 8D and shows a longitudinal section of two of the actuators 300*a* and 300*b*. When one of the actuators is substantially extended toward end casing 104$x$ and the other is substantially extended toward end casing 104$y$. Thrust bearings 316$xa$ and 316$xd$ are in slidable contact with thrust plate 112$x$ that is mounted and fixed to end casing 104$x$ by bolts (not seen) in countersunk thrust plate mounting openings 111. Slotted thrust bearings 316$ya$ and 316$yd$ are seen in slidable contact against thrust plate 112$y$. Thrust plate 112$y$ is held fixed in casing 104$y$ at the opposite end of assembly 1, mounted in a similar fashion. Thrust bearings 316$x$ and 316$y$ are held at the same non-right-angle (with respect to the axis 102) defined by thrust plates 112$x$ and 112$y$ within the end casings 104$x$ and 104$y$. Acceptable ranges for the angle vary, depending on the displacement desired.

Referring now to FIG. 8F, which is a section along line C of FIG. 8D, bracket 334$xa$ is seen connected to the spherical ball connector 308$xa$ to aid in stabilization of piston rod 306$xa$, as described above. Bracket 334$ya$ is seen connected to stabilization rod 338$al$.

Also seen in FIG. 8F is a cross section of the rotor 200, showing lubrication ports 336$x$ and 336$y$ that are radially aligned to communicate with grooves 116 and 118 in center casing 106. Lubrication ports 336$x$ and 336$y$ connect grooves 118$x$ and 118$y$, respectively, with lubrication channels 340$x$ and 340$y$ in rotor 200. Lubrication pathway 342$x1$ provides lubrication to thrust bearing 348$x$ and pathway 342$x2$ supplies roller bearing 350$x$, while lubrication pathways 342$y$ provides lubrication to thrust bearing 348$y$ and roller bearing 350$y$. Acceptable thrust bearings 348 include SKF 81215 TN; others will occur to those of skill in the art.

Referring still to FIGS. 8E and 8F, in operation, fluid has begun entering chamber 332$xd$ from radial pressure port 206$xd$, supplied by input groove 116$x$ from inlet orifice 110$x$ (seen in FIG. 8D) causing piston rod 306$yd$ to extend toward thrust plate 112$y$, applying pressure with slotted thrust bearing 316$yd$ to the face of thrust plate 112$y$ and causing slotted thrust bearing 316$yd$ to slide along thrust plate 112$y$. Since thrust plates 112 are at a 90-degree angle, rotor 200 and piston rods 306$xd$ rotate around axis 102. That rotation applies force from thrust plate 112$x$ to piston rod 306$xd$, causing fluid to exhaust from chamber 332$xd$. At the illustrated point in the cycle, chamber 332$yd$ is almost completely full, and chamber 332$xd$ is just beginning to fill. Just before the position illustrated in FIGS. 8D and 8E, slotted thrust bearing 316$xd$ was as far to the x-side of actuator 1 that it could go. When there, pressure port 206$xd$ was not in communication with input groove 116$x$. It was between input groove 116$x$ and exhaust groove 118$x$.

Referring again to FIG. 8D, as pressure port 206$xd$ continues to rotate in a counter-clockwise fashion, it will travel almost 180 degrees and then be isolated from input groove 116$x$ before being connected to exhaust groove 118$x$. At that point, the x-side of actuator 300*d* (see FIG. 8E) will begin to exhaust and the y-side will begin to be pressurized, because pressure port 206$yd$ will have come into contact with input groove 116$y$ and will no longer be in contact with exhaust groove 118$y$.

Referring again to FIG. 3, lubrication channels 342$x$ and 342$y$ communicate with piston lubrication ports 344$x$ and 344$y$, such that lubrication channel 342$x$ communicates with lubrication port 344$y$, and lubrication channel 342$y$ communicates with lubrication port 342$x$. Thus, when piston rod 306$x$ is being forced toward the x-side of the assembly 1, the pressure on piston head face 304$y$ forces fluid into lubrication channel 342$x$, which then supplies lubrication to spherical ball connector 308$x'$ (which is through lubrication void 346$x$). Likewise, when piston rod 306$y$ is being forced toward the y-side of the assembly 1, the pressure on piston head face 304$x$ forces fluid into lubrication channel 342$y$, which then supplies lubrication to spherical ball connector 308$y'$ through lubrication void 346$y$. In this way, the pivoting connection between spherical ball connectors 308 and tongue connectors 310, when under load, is secured. Lubrication seeps from the pivoting connection and drains through drain holes 105, as discussed earlier. Lubrication is applied in this example by the hydraulic fluid used to pressurize the x-side and the y-side chambers. In some alternative examples, the head and rods are separable and connected by any connectors known in the art.

Referring now to FIGS. 9 and 9A, an alternative example assembly 1 is seen in exploded view. Parts that have not changed from the example of FIGS. 5 and 5A have the same alpha-numeric designation. Parts that are different include a "prime" notation of an apostrophe. Those are thrust bearings 316', spherical ball connector 308', rotor 202', rotor face 202', bore 204*a'*, and thrust plates 114'.

Slotted thrust bearing 316' replace thrust bearings 316 and tongue connectors 310 of FIGS. 5 and 5A. Thrust bearings 316' (FIGS. 9 and 9A) receive spherical ball connectors 308' in a concave side, similar to tongue connectors 310; however, thrust bearings 316' are not constrained by any shoulder 115 of thrust plates 114. As seen in the y-side of FIG. 9, slotted thrust bearing 316ya slides freely in any direction across thrust plate face 117y.

Referring still to FIGS. 9 and 9A, spherical ball connectors 308' have each a tapping (not shown in the Figures) (for example, a ¼" UNC Tapping) and that receives a set screw 352 for the use of throttling the flow of fluid through spherical ball connector 308'.

Also seen in FIG. 9 are the connectors to connect end casings 104x and 104y to center casing 106. As seen, casing bolts 124 pass through the end casings 104 and are screwed into threaded bores 125 in casing 106. Also, thrust plate bolts 126 pass through washers 128 and engage threaded holes 358 in the thrust plates 114 and 114' (no difference in either example). Acceptable casing bolts 124 include ANSI B18.3-½-13 UNC-5 HS HCS; acceptable washers 128 include ANSI B18.22.1-⅜-wide-Type A; acceptable thrust plate bolts 126 include ANSI B18.3-⅜-16 UNC-1½ HS HCS. Others will occur to those of ordinary skill.

FIG. 9A shows another view of an actuator, similar to that of FIG. 5A, but also including the stabilizer bars 338a1 and 338a2 and bracket 334a. Further, piston rod 306ya is seen connected to spherical ball connector 308ya'. Piston head 302 (not seen) is covered by seal 305a and polymer rings 303xa and 303ya.

Figure 10:
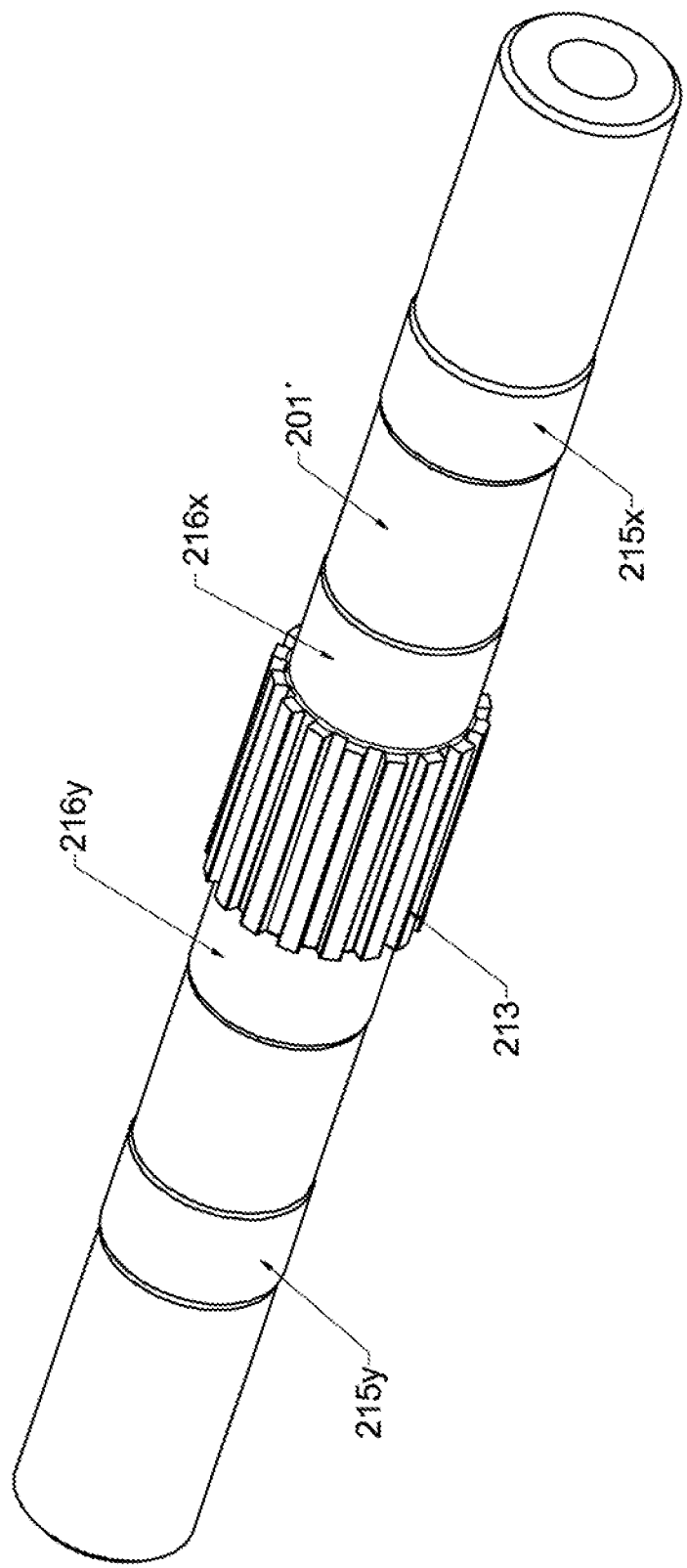
FIG. 10 is a 3 dimensional view of an example of the invention.

FIG. 10 is a 3 dimensional view of shaft 201' showing shaft splines 213 and raised areas 215x and 215y (which serve the purpose of interaction with roller bearing locations) and raised areas 216x and 216y for interaction with thrust bearings.

Figure 11:
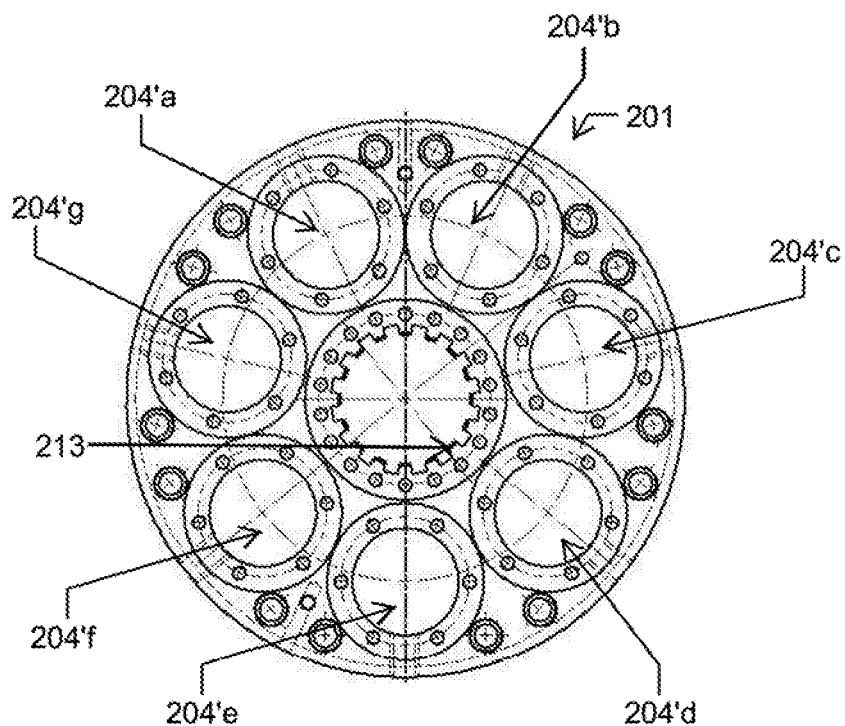
FIG. 11 is an end view of an example of the invention.

FIG. 11 is an end view of rotor 201' having bores 204' and rotor splines 217 that mate with shaft splines 213 (FIG. 11) for transferring rotational force between rotor 200' and shaft 201.

Figure 12:
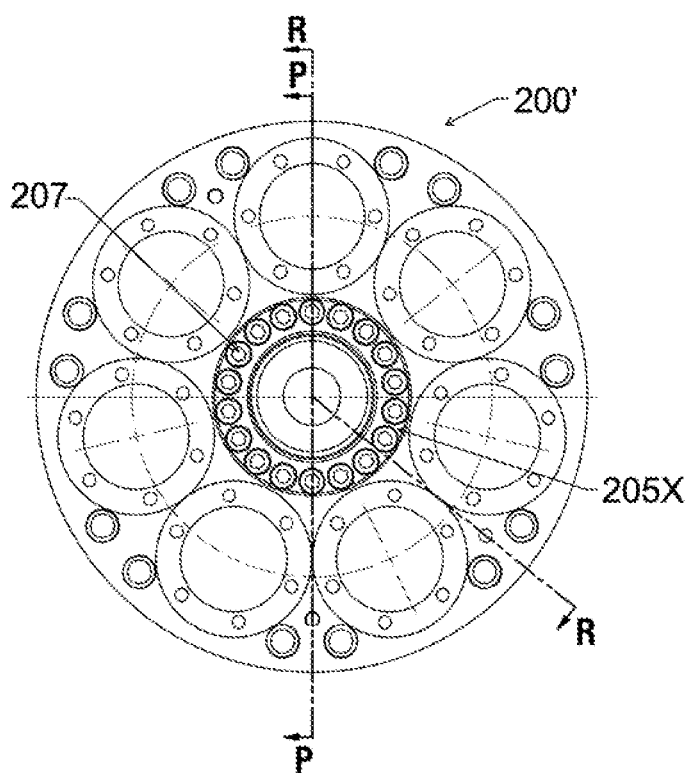
FIG. 12 an end view of an example of the invention.
Figure 12A:
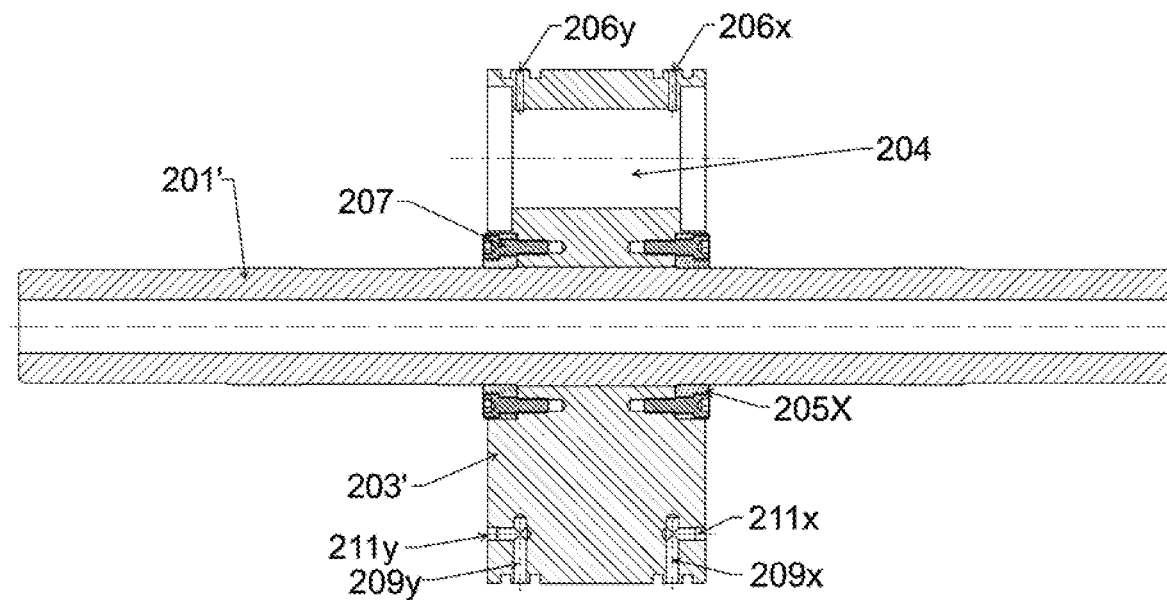
FIG. 12A is a sectional view of an example of the invention.

Referring now to FIG. 12, an end view of an alternative rotor 200' is seen. FIG. 12A is a section of rotor 200' through line P of FIG. 12, and FIG. 12B is a section of rotor 200' through line R of FIG. 12.

Figure 12B:
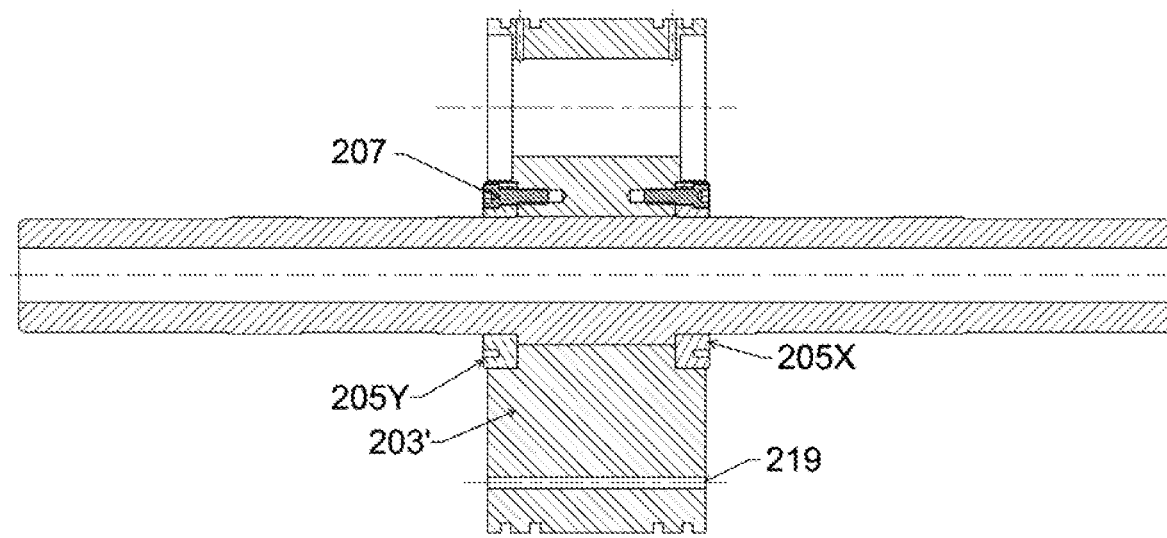
FIG. 12B shows an example of the invention.

FIGS. 12A and 12B show splined shaft 201 mounted in splined rotor block 203' that has bores 204 as in rotor 200 of the previously described example. Radial movement between shaft 201 and block 203 is prevented by clamp plates 205x and 205y, which are held in place by clamp bolts 207 (e.g., ANSI B18.3-⅜-16 UNC-1¼ HS HCS) that are screwed into block 203.

FIG. 12A illustrates lubrication ports 209x and 209y that communicate with grooves 116 and 118 of casing 106 (FIGS. 7A and 7B). Holes 211x and 211y connect a nozzle (not seen) to lubrication ports 209x and 209y that sprays fluid in the spaces between rotor 200' and thrust plates 112x' and 112y' (FIG. 14) lubricating the moving parts in those spaces, along with thrust bearings 348.

Referring again to FIG. 12B, 306xc, hole 219 allows fluid that accumulates on one side of rotor 200 to communicate with the other side for drainage when the assembly 1 is not mounted horizontally.

Figure 13:
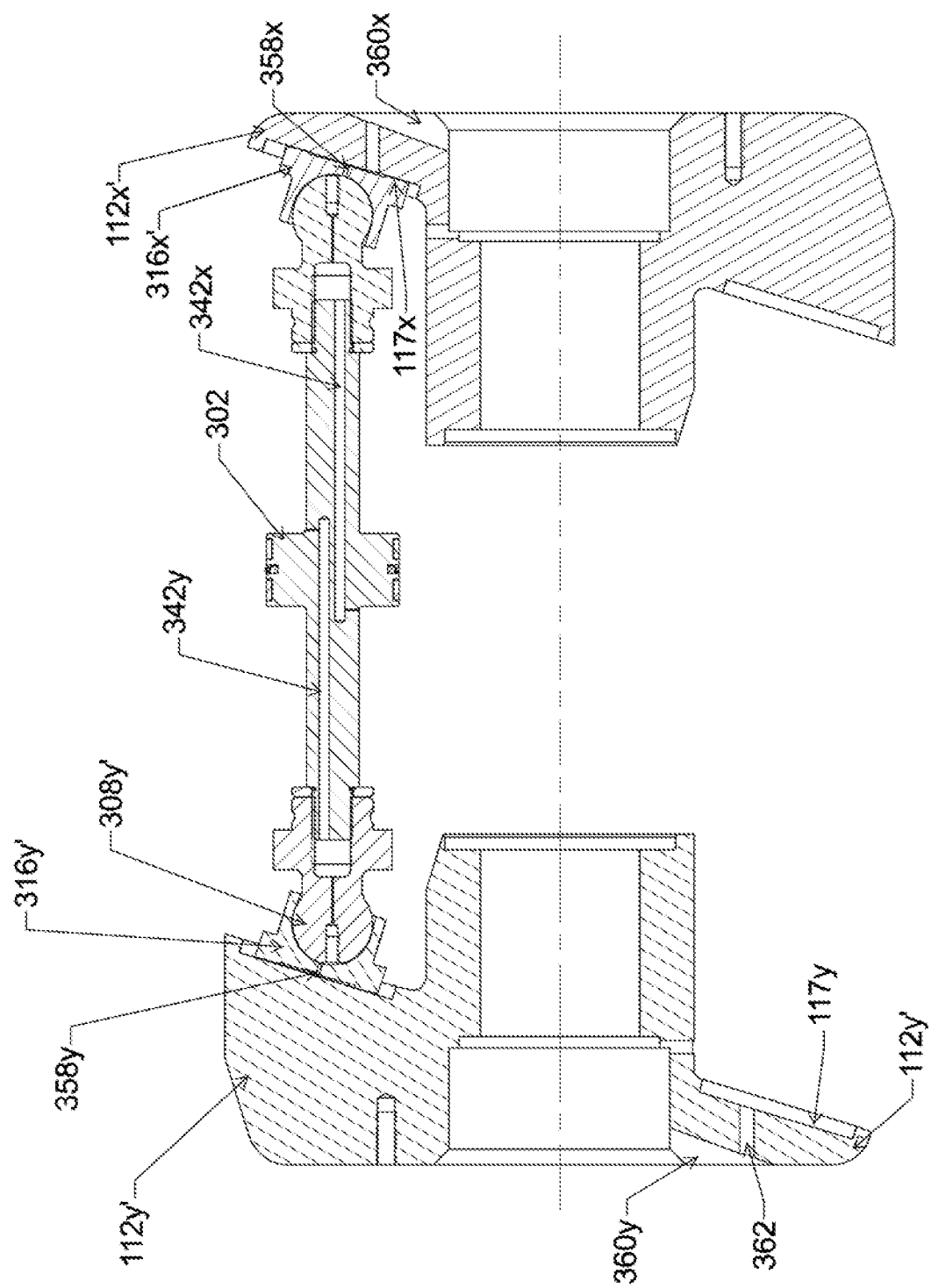
FIG. 13 shows a further example of the invention.

Referring now to FIG. 13, the piston head 302 and rods 306 have lubrication ports 342 as described in the previous example (FIG. 4), and they communicate with thrust bearings 316. Thrust bearings 316 also include thrust bearing lubrication passages 358 that allows fluid to lubricate the thrust plate surfaces 117. Passages 362 in thrust plates 112 are connected to slots 360, which allows fluid to migrate behind thrust plates 112.

Figure 14:
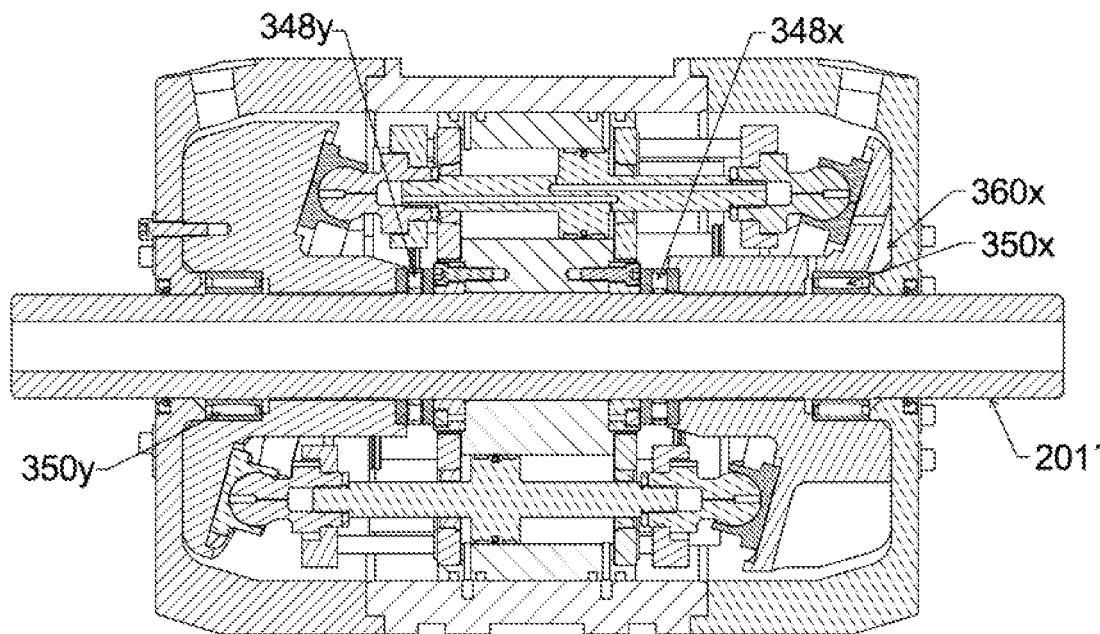
FIG. 14 still another example of the invention.

As seen in FIG. 14, thrust plate slots 360 supply lubrication fluid to roller bearings 350 and thrust bearings 348 (through the gap between thrust plates 350 ad shaft 201').

Figure 15:
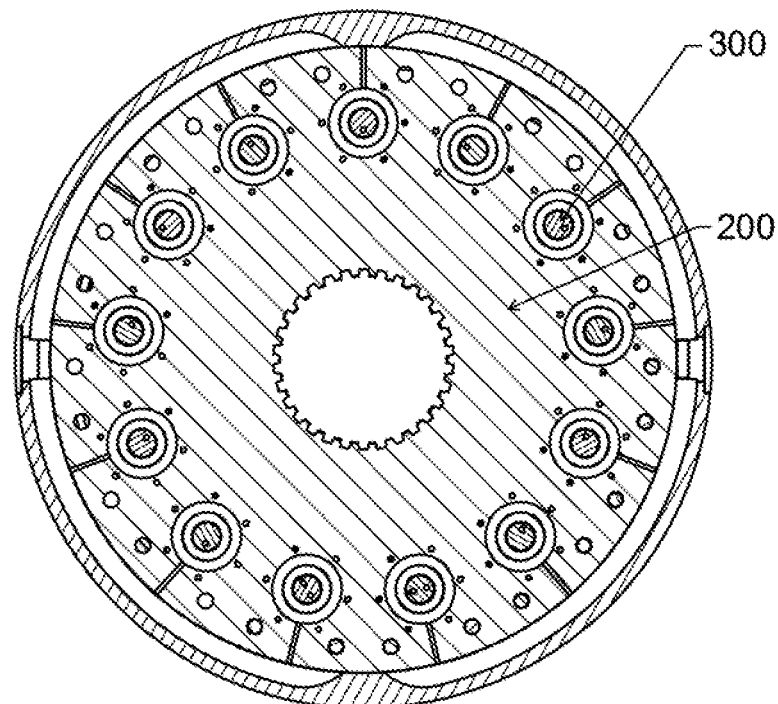
FIG. 15 is a section view of an example of the invention.

Referring now to FIG. 15 a section view of an example of the invention using thirteen actuators 300 in a splined rotor 200 with a proportionately large center opening, allowing for passage of material along the axis 102, depending on the application. For example, in some applications, the center opening is fitted with impellers, and the assembly is inserted in a pipeline or other flow stream. Pressure on the impellers causes the rotor to turn, allowing operation of the assembly in a pumping mode. Other variations in the number of actuators and sizes of any central openings will occur to those of skill in the art without further elaboration in this document.

The above description is given by way of example only. No limitation on the definition of the invention is intended without an expressly limiting definition; the intention is that the invention be limited only by the scope of the claims below.

What is claimed is:

1. A process of turning a rotor, comprising:
applying hydraulic pressure to a first side of a first piston of a first actuator that is connected in a fixed position with the rotor such that when the first actuator rotates around an axis of the rotor, the rotor turns on the axis of the rotor, wherein the applying hydraulic pressure to the first side of the first piston makes the first actuator apply pressure to a first plate, the first plate having a center that is co-axial with the axis of the rotor, and the first plate being fixed at an angle to an axis of the first actuator; and
applying hydraulic pressure to a second side of the first piston making the first actuator apply pressure to a second plate, the second plate being fixed at the angle to the axis of the first actuator;
wherein the applying hydraulic pressure to the first side of the first piston of the first actuator comprises supplying fluid from a first source that is independent from a second source for the applying hydraulic pressure to the second side of the first piston.

2. The process of claim 1, further comprising:
applying hydraulic pressure to a first side of a second piston of a second actuator making the second actuator apply pressure to the first plate during the applying hydraulic pressure to the second side of the first piston; and
applying hydraulic pressure to a second side of the second piston making the second actuator apply pressure to the second plate during the applying hydraulic pressure to the first side of the first piston.

3. The process of claim 1, wherein the applying hydraulic pressure to the first side of the first piston comprises supplying hydraulic fluid through a radial port into a pressure chamber defined in part by the first side of the first piston.

4. The process of claim 3, further comprising exhausting the fluid from the first side of the first piston during the applying pressure to the second side of the first piston.

5. The process of claim 4, wherein the exhausting the fluid from the first side of the first piston comprises connecting the radial port to an exhaust orifice.

6. The process of claim 1, wherein an I/O casing located around the rotor includes a pressure orifice in fluid communication with a pressure groove in an interior face in the I/O casing that extends less than half a circumference of the I/O casing for supply of fluid in the applying hydraulic pressure to the first side of the first piston and an exhaust orifice in fluid communication with an exhaust groove in the interior face in the I/O casing that extends less than half the circumference of the I/O casing for exhausting the fluid from the first side of the first piston.

7. The process of claim 1, further comprising stabilizing a push rod, the push rod extending between the second side of the first piston and a push rod assembly that is in slidable contact with the first plate.

8. A system for turning a rotor, the system comprising:
means for applying hydraulic pressure to a first side of a first piston of a first actuator that is connected in a fixed position with the rotor such that when the first actuator rotates around an axis of the rotor, the rotor turns on the axis of the rotor, wherein the applying hydraulic pressure to the first side of the first piston makes the first actuator apply pressure to a first plate, the first plate having a center that is co-axial with the axis of the rotor, and the first plate being fixed at an angle to an axis of the first actuator;
means for applying hydraulic pressure to a second side of the first piston making the first actuator apply pressure to a second plate, the second plate being fixed at the angle to the axis of the first actuator; and
means for exhausting the fluid from the first side of the first piston during the applying pressure to the second side of the first piston.

9. The system of claim 8, further comprising:
means for applying hydraulic pressure to a first side of a second piston of a second actuator making the second actuator apply pressure to the first plate during the applying hydraulic pressure to the second side of the first piston; and
means for applying hydraulic pressure to a second side of the second piston making the second actuator apply pressure to the second plate during the applying hydraulic pressure to the first side of the first piston.

10. A system for turning a rotor, comprising: an actuator;
a first plate having a center that is co-axial with an axis of the rotor and fixed at an angle to an axis of the actuator;
a piston of the actuator that is connected in a fixed position with the rotor such that when the actuator rotates around the axis of the rotor, the rotor turns on the axis of the rotor, wherein a first side of the piston is configured to receive fluid pressure thereby making the actuator apply pressure to the first plate; and
a second plate fixed at the angle to the axis of the actuator, wherein a second side of the piston is configured to receive fluid pressure thereby making the actuator apply pressure to the second plate; and
a first source of fluid for supply to the first side of the piston that is independent from a second source of fluid for supply to the second side of the piston.

11. The system of claim 10, wherein the first side of the piston includes a radial port selectively in fluid communication with a pressure orifice to receive fluid and an exhaust orifice for exhausting the fluid.

12. The system of claim 10, wherein an I/O casing located around the rotor includes a pressure orifice in fluid communication with a pressure groove in an interior face in the 1/0 casing that extends less than half a circumference of the 1/0 casing for supply of fluid to the first side of the piston and an exhaust orifice in fluid communication with an exhaust groove
in the interior face in the 1/0 casing that extends less than half the circumference of the 1/0 casing for exhausting the fluid from the first side of the piston.

13. A process of turning a rotor, comprising:
applying hydraulic pressure to a first side of a first piston of a first actuator that is connected in a fixed position with the rotor such that when the first actuator rotates around an axis of the rotor, the rotor turns on the axis of the rotor, wherein the applying hydraulic pressure to the first side of the first piston makes the first actuator apply pressure to a first plate, the first plate having a center that is co-axial with the axis of the rotor, and the first plate being fixed at an angle to an axis of the first actuator; and
applying hydraulic pressure to a second side of the first piston making the first actuator apply pressure to a second plate, the second plate being fixed at the angle to the axis of the first actuator; and
stabilizing a push rod, the push rod extending between the second side of the first piston and a push rod assembly that is in slidable contact with the first plate.

\* \* \* \* \*